(12) United States Patent
Haldorsen et al.

(10) Patent No.: US 9,772,419 B2
(45) Date of Patent: Sep. 26, 2017

(54) DECOMPOSING FULL-WAVEFORM SONIC DATA INTO PROPAGATING WAVES FOR CHARACTERIZING A WELLBORE AND ITS IMMEDIATE SURROUNDINGS

(71) Applicant: Read AS, Hvalstad (NO)

(72) Inventors: Jakob B. U. Haldorsen, Hvalstad (NO); Espen Stensrud, Vollen (NO)

(73) Assignee: Read AS, Hvalstad (NO)

( * ) Notice: Subject to any disclaimer, the term of this patent is extended or adjusted under 35 U.S.C. 154(b) by 81 days.

(21) Appl. No.: 14/643,646

(22) Filed: Mar. 10, 2015

(65) Prior Publication Data

US 2015/0331134 A1 Nov. 19, 2015

Related U.S. Application Data

(60) Provisional application No. 61/950,484, filed on Mar. 10, 2014.

(51) Int. Cl.
*G01V 1/48* (2006.01)
*E21B 47/00* (2012.01)
*G01V 1/50* (2006.01)

(52) U.S. Cl.
CPC ............ *G01V 1/48* (2013.01); *E21B 47/0005* (2013.01); *G01V 1/50* (2013.01)

(58) Field of Classification Search
CPC ......... E21B 47/0005; G01V 1/48; G01V 1/50
(Continued)

(56) References Cited

U.S. PATENT DOCUMENTS

| 7,149,146 B2* | 12/2006 | Kuijk | E21B 47/0005 181/105 |
| 7,639,563 B2* | 12/2009 | Wu | G01V 1/50 181/105 |
| 2016/0041287 A1* | 2/2016 | Merciu | E21B 47/091 367/25 |

FOREIGN PATENT DOCUMENTS

VG        EP 1505252 B1 * 9/2005 ......... E21B 47/0005

OTHER PUBLICATIONS

Borland, W., Edwards, J., Kurniawan, H., Goossens, P. and Fuping, Z., 2007, Borehole acoustic reflection survey for geosteering validation: Presented at the 1st Annual Middle East Regional Symposium, SPWLA.

(Continued)

*Primary Examiner* — Daniel L Murphy
(74) *Attorney, Agent, or Firm* — Oblon, McClelland, Maier & Neustadt, L.L.P.

(57) ABSTRACT

A method for estimating parameters of a propagating wave field, such as the direction of propagation in 3D space of an acoustic wave from borehole-acoustic data. The estimation technique uses phase delays between recordings made by the individual receivers related to a plane wave travelling across the receiver array. The estimated plane waves include the wave field generated directly by the acoustic source, as well as refracted and reflected components of these fields. The technique can be used with overlapping wave fields. This will provide significant improvements in the quality of formation properties estimated from full-waveform data that are obtained either from wireline or from while-drilling sonic data. The inventive method enables characterization of abnormalities outside multiple casing strings where acoustic signals are transmitted from a source located inside said multiple casing string.

3 Claims, 26 Drawing Sheets
(21 of 26 Drawing Sheet(s) Filed in Color)

(58) Field of Classification Search
USPC .................................................. 367/31, 35
See application file for complete search history.

(56) References Cited

OTHER PUBLICATIONS

Esmersoy, C., Chang, C., Kane, M., Coates, R., Tichelaar, B., and Quint, E., 1998. Acoustic imaging of reservoir structures from a horizontal well; *The Leading Edge,* 17, 940-946.

Fuping, Z., Alexander, D., Goossens, P., Kurniawan, H., Borland, W. and Edwards, J., 2007, First Sonic Imaging AVA: *77th Ann. Internat. Mtg.,* Soc. Expl. Geophys., Extended Abstracts, 538-541.

Haldorsen, J., Borland, W., Al Rougha, H. A. B., Sultan, A., Meehan, R , 2005: "Azimuthal Sonic Imaging." Extended Abstract, 67th Mtg.: Eur. Assn. Geosci. Eng., paper 1-017, Madrid.

Haldorsen, J. B. U., Voskamp, A., Thorsen, R., Vissapragada, B., Williams, S. and Fejerkov, M., 2006, Borehole acoustic reflection survey for high resolution imaging: *76th Ann. Internat. Mtg.,* Soc. Expl. Geophys., Extended Abstracts, 314-318.

Haldorsen, J., A. Voskamp, R. Thorsen, B. Vissapragada, S. Williams, and M. Fejerskov (Hydro), 2006, "Borehole Acoustic Reflection Survey for high resolution imaging", SEG Expanded Abstracts 25, 31.

Havira, R. M., 1986, Ultrasonic techniques in oil well logging, in Proc. IEEE Ultrason. Symp., 563-571.

Hayman, A. J., P. Parent, P. Chung, and P. Verges, 1994, Improved borehole imaging by ultrasonic, paper SPE 28440,$69^{th}$ SPE Annual Technical Conference and Exhibition, New Orleans, LA.

Hirabayashi, N., Leaney, W. S. and Haldorsen, J. B. U., 2008, Wavefield separation for borehole acoustic reflection surveys using parametric inversion: *78th Ann. Internal. Mtg.,* Soc. Expl. Geophys., Extended Abstracts.

Hornby, B. E., 1989. Imaging of near-borehole structure using full-waveform sonic data, *Geophysics,* 54, 747-757.

Maia, W., R. Rubio, F. Junior (Petrobras), J. Haldorsen, R. Guerra, and C. Dominguez, 2006, "First Borehole Acoustic Reflection Survey mapping a deep-water turbidite sand", SEG Expanded Abstracts 25, 1757-1760.

Van Kuijk, R., B. Froelich, M. Alouch, S. Bose, D. Miller, J.-L. le Calvez, V. Schoepf, and A. Pagnin, 2005, A Novel Ultrasonic Cased-Hole Imager for Enhanced Cement Evaluation, IPTC 10546, International Petroleum Technology Conference, 2005.

Yamamoto, H., Haldorsen, J. B. U., Mikada, H. and Watanabe, S., 1999, Fracture imaging from sonic reflection and mode conversion: *69th Ann. Internat. Mtg.,* Soc. Expl. Geophys., Extended Abstracts, 148-151.

Zeroug, S., B. Froelich, 2003, Ultrasonic Leaky-Lamb Wave Imaging Through a Highly Contrasting Layer, IEEE Ultrasonic Symposium, 794-798.

\* cited by examiner

Cylindrical coordinates

Carthesian

DECOMPOSING FULL-WAVEFORM SONIC DATA INTO PROPAGATING WAVES FOR CHARACTERIZING A WELLBORE AND ITS IMMEDIATE SURROUNDINGS

CROSS-REFERENCE TO RELATED APPLICATIONS

This application is based upon and claims the benefit of priority from U.S. Provisional Patent Application 61/950,484, filed on Mar. 10, 2014; the entire contents of which are incorporated herein by reference.

INTRODUCTION

The present invention relates to a method for characterizing external surroundings of a casing string. More specifically, the method comprises transmitting acoustic signals from a source located inside a multiple casing string for characterizing abnormalities outside a multiple casing string.

BACKGROUND

The present invention enables estimation of parameters of a propagating wave field, such as the direction of propagation in 3D space of an acoustic wave from borehole-acoustic data. The estimation technique uses the phase delays between recordings made by the individual receivers related to a plane wave travelling across the receiver array. The estimated plane waves would include the wave field generated directly by the acoustic source, as well as refracted and reflected components of these fields. The technique can be used with overlapping wave fields. This could potentially lead to significant improvements in the quality of formation properties that is estimated from full-waveform data, obtained either from wireline or from while-drilling sonic data.

We also show, using ultrasonic data, that we can use these propagating modes to measure the location and the reflectivity abnormalities outside of multiple casing strings, allowing inference about material properties behind multiple casing strings.

Since the original work by Hornby (1989), with a 12-receiver station tool (EVA, developed by Elf/CGG), Sonic Imaging has been attempted with varying success using a number of different implementations. The root cause for most of the problems with any of these variations is that the well bore is an excellent guide for acoustic waves. This acoustic wave guide would cause energy reflected by the well surroundings to be over-powered by energy trapped in the well bore.

In 2002 and early 2003, a new set of processing algorithms were developed (Haldorsen et al., 2005) using adaptive filters to control the Stoneley waves. These algorithms allowed the use of much shorter source-receiver offsets. A short source-receiver offset is geometrically much more favorable for near-wellbore reflection imaging.

The reflection data are converted into images of the formation using synthetic-aperture processing.

Adaptive filters were also used with the receivers mounted around the perimeter of the tool to determine the azimuth of the acoustic reflectors, in effect creating a 3D image around the borehole. With the new algorithms, Sonic Imaging (with the acronym BARS from Borehole Acoustic Reflection Survey) could be applied to data acquired with the Sonic Scanner in its standard configuration, allowing data produced by any sonic job to be used for imaging.

Ultrasonic pulse-echo techniques were initially developed as a form of acoustic caliper technique (Havira, 1986). Hayman et al. (1994) realizing that the high frequencies, 290-550 kHz, allowed the imaging of the backside of the casing, allowing ultrasonic tools to be used for estimating the thickness of the casing wall. However, the extremely high contrast between the steel of the casing and the fluid or cement behind the casing, would set up standing waves that made it very difficult to make sense of components of the signal that actually had penetrated into the annulus behind the casing.

Zeroug and Froelich (2003) realized that a flexural mode in the casing, traveling along the well, would leak into the annulus, be reflected from features in the annulus, and by recording such waves, that could be able to image the structures behind the casing.

This is the technology behind the Schlumberger Isolation Scanner tool, designed to specifically measure waves refracted along the well, with the purpose to improve the characterization of the annular environment (van Kuijk et al, 2005). The Isolation Scanner has both a pulse-echo transceiver and a combination of transmitter and receivers designed to excite and record flexural waves in the casing. The tool, which rotates at the bottom of the tool, scans the casing at predetermined intervals allowing 360° azimuthal coverage to help identifying channels in the cement and confirming the effectiveness of a cement job for zonal isolation.

The acoustic waves emitted from an acoustic tool in a cased well scattered, reflected and refracted from inhomogeneities in the formation outside the inner casing (see FIG. 1).

According to the present invention acoustic data, generated by a known source and recorded by an array of acoustic receivers mounted on the surface of a cylindrical tool in a wellbore, is separated into propagating plane waves and the propagation parameters for these plane-wave components is estimated individually. This method allows separation of borehole modes from body waves, and where the body waves are used for imaging formation features outside of the well bore. Similarly, the ray parameters of the plane-wave components give information about the direction to a feature in the formation that acts as an acoustic scatter (for body waves), and for the tool eccentricity (for borehole modes).

By using ultrasonic data, these propagating modes is used for measuring the location and the reflectivity of abnormalities outside of multiple casing strings, allowing inference about material properties behind multiple casing strings.

SHORT DESCRIPTION OF THE INVENTION

A method for characterizing properties outside a multiple casing string, comprising transmitting acoustic signals from a source located inside said multiple casing string; recording received signals on an array of acoustic receivers mounted on a longitudinal cylindrical tool inside said multiple casing string, and processing received signals by performing the following steps:

a. separating received acoustic signals into components of propagating plane waves by measuring the phase delay of received signals;

b. estimating propagation parameters for each component of propagating plane waves for differentiating different propagating wave modes;

c. sorting propagating wave modes into borehole modes and body wave modes;
d. processing and characterizing body wave modes for characterizing properties outside of the multiple casing string.

Other features of the invention are defined in the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention will now be described in detail with reference to the drawings where.

DETAILED DESCRIPTION OF THE INVENTION

Figure 1:
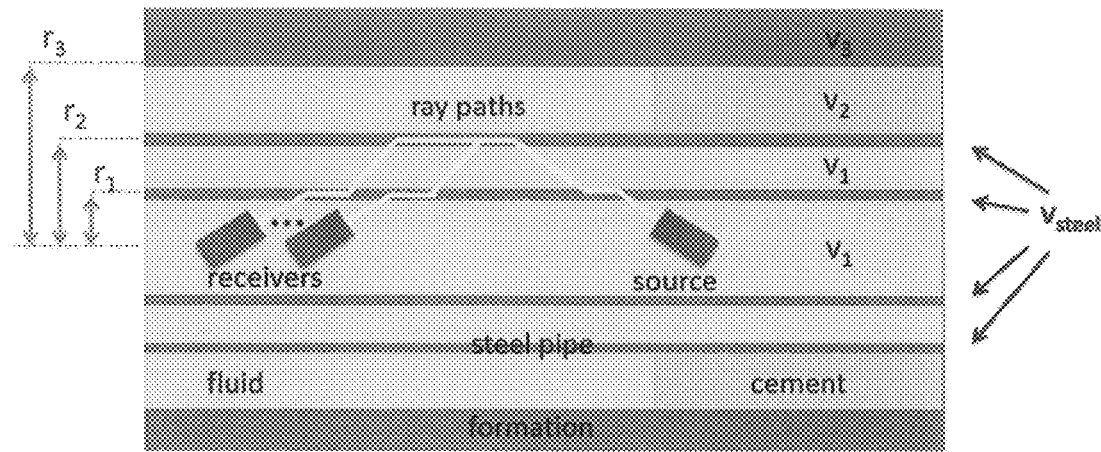
FIG. 1: Ray paths for refraction/borehole signal with an acoustic signal in the well.

FIG. 1 shows the Ray paths for refraction/borehole signal with an acoustic signal in the well. The acoustic waves emitted from an acoustic tool in a cased well is scattered, reflected and refracted from inhomogeneities in the formation outside the inner casing. The figure is showing the border between cement and fluid in the annulus of multiple casing strings.

Figure 2:
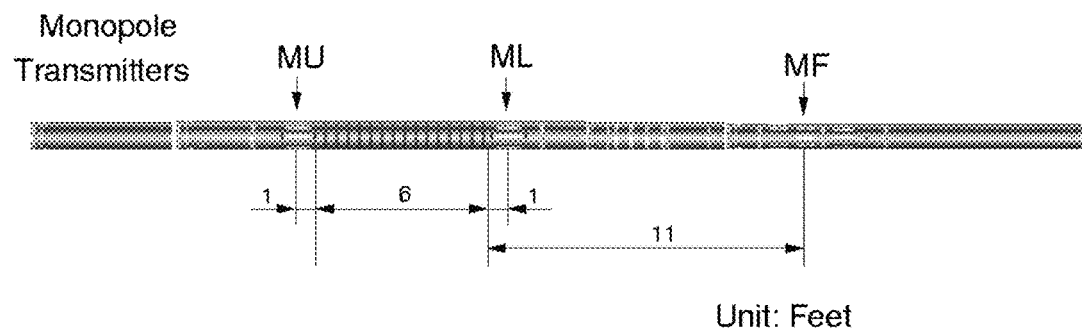
FIG. 2: Sonic Scanner tool.
Figure 3:
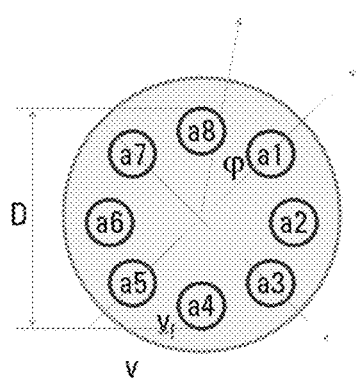
FIG. 3: Cross section of a receiver station of the Sonic Scanner tool.

FIG. 2 shows the configuration of the Schlumberger sonic tool, the Sonic Scanner©. The key features of this tool is summarized as 13 receiver stations distributed at 0.5 ft intervals along the axis of the tool. Each station consists of 8 hydrophones located at 45° intervals around the perimeter of the tool, as illustrated in FIG. 3; 3 monopole transmitters, 2 offset by 1 ft on either end of the receiver section (MU and ML), and 1 that is 11 ft below the receiver array (MF), and 2 mutually perpendicular dipole tools with dipole axes perpendicular to the tool axis.

Several potentially severe problems were solved by using the Sonic Scanner in its standard configuration.

The large dynamic range of Sonic Scanner (giving digitized data at 16-bit resolution) allows weak reflections to be recorded in the presence of powerful modes trapped in the well bore.

The simply shaped construction of Sonic Scanner makes it possible to apply powerful model-guided adaptive filters to separate the strong, guided modes from the weak reflections.

13 receivers at separate eight azimuths makes it possible to determine at which side of the well bore a reflector is located.

The Schlumberger Isolation Scanner© tool is specifically designed to measure waves refracted along the well. The tool has both a pulse-echo transceiver and a system consisting of a combination of a single transmitter and two receivers designed to excite and record flexural waves in the casing. The tool, which rotates at the bottom of the tool, scans the casing at predetermined angular intervals allowing 360° azimuthal coverage.

The following example uses field data from the North Sea acquired with said Sonic Scanner© for Statoil. The data are acquired in the deep part of a cased well. The sonic waveforms were acquired within single and double casing.

Figure 4A:
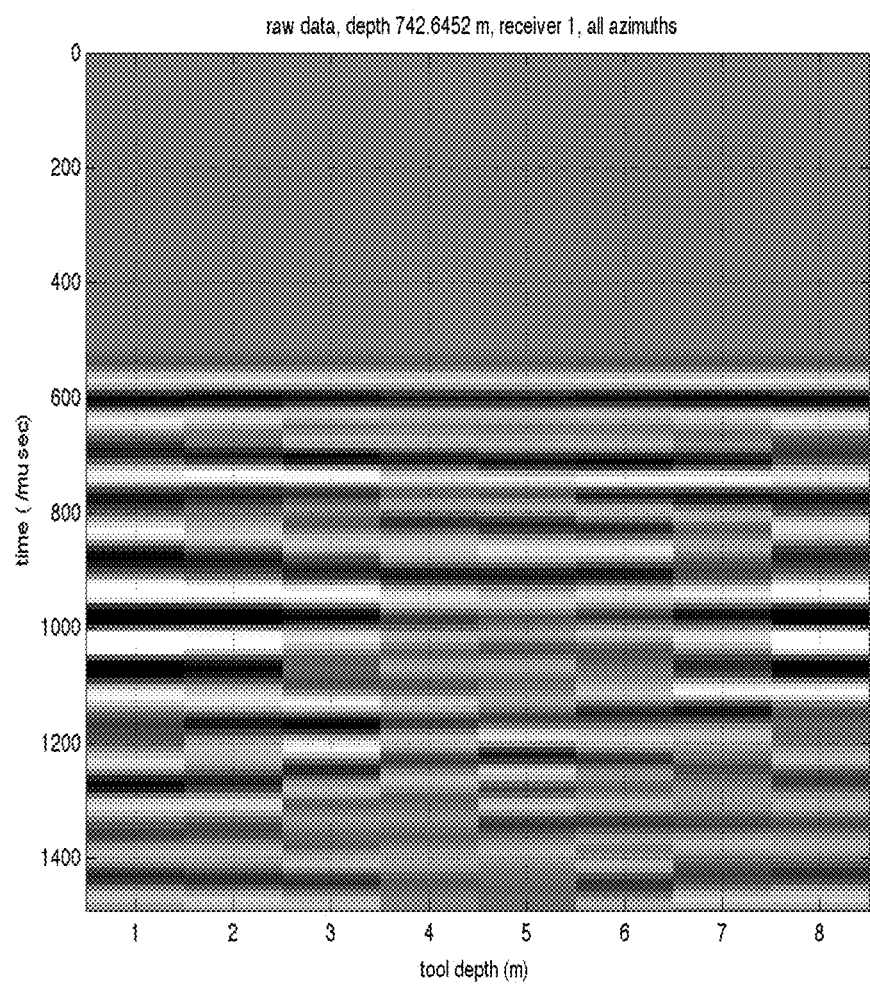
FIG. 4A: At measured depth 2717 m: eight data traces acquired at a fixed receiver of 7 ft.
Figure 4B:
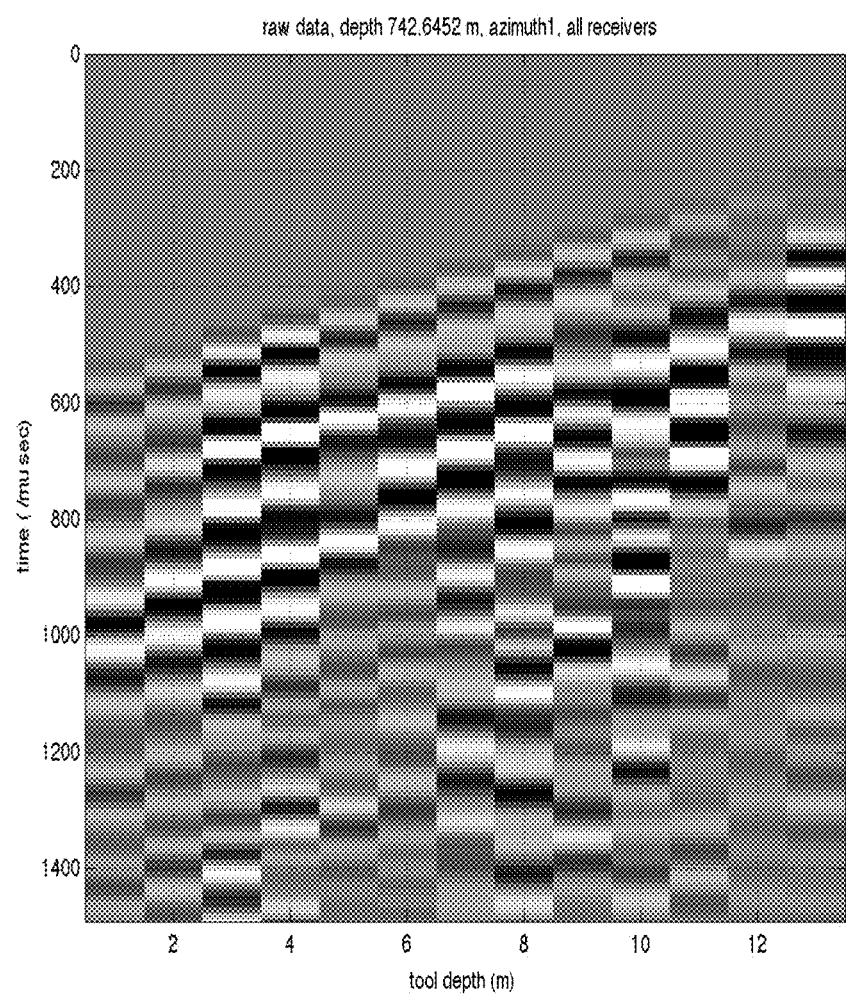
FIG. 4B: At measured depth 2717 m: thirteen data traces recorded at a fixed azimuth and source-receiver offset between 1 and 7 ft.
Figure 4C:
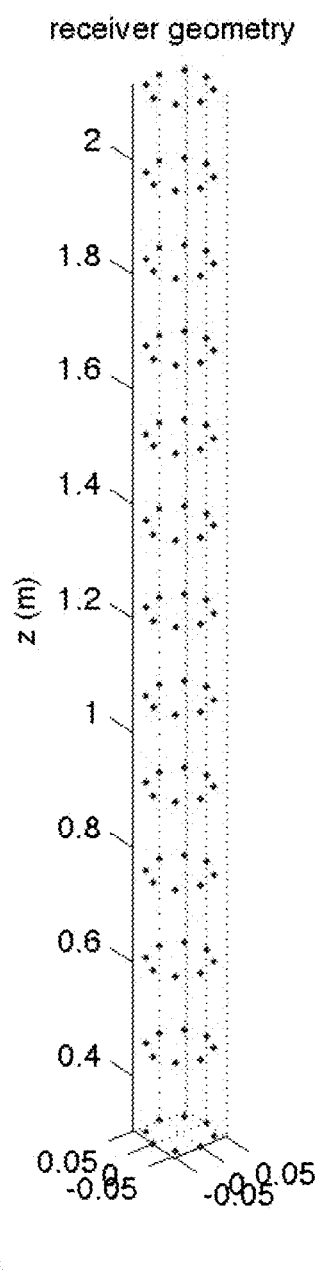
FIG. 4C: Receiver geometry.

FIG. 4 shows sonic full-waveform data recorded at a depth of 2717 m. The borehole guided waves are dominant. At the nearest receiver, the casing-refracted wave arrives at around 200 µs, at the far offset at around 600 µs. The later arriving, slower compressional, shear and Stoneley waves are hardly distinguishable below the casing arrival.

Figure 10A:
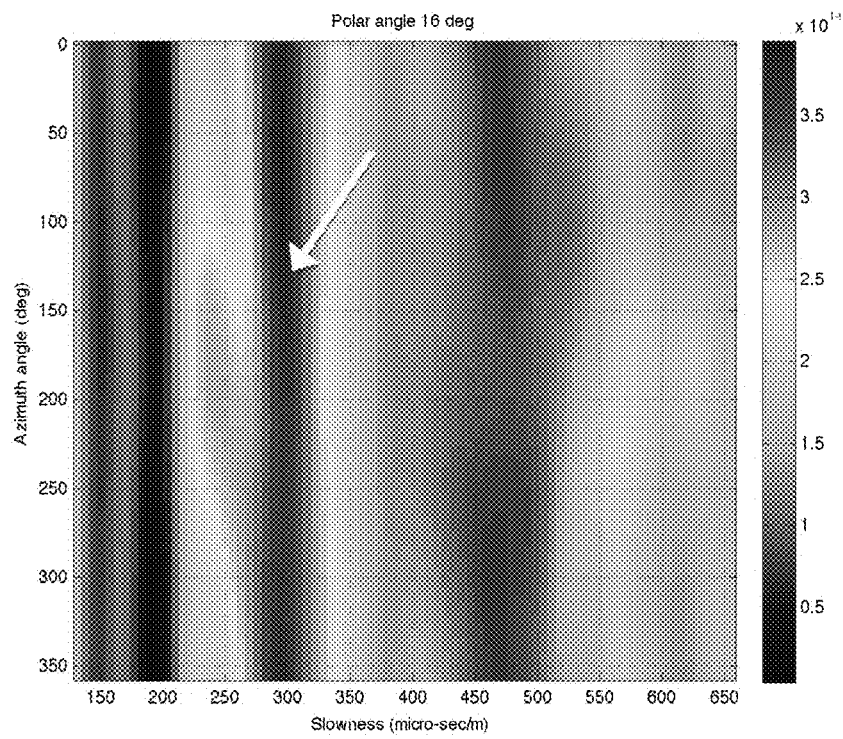
FIG. 10A: Stacking semblance related to the 4th most coherent wave-field component for the data recorded with the middle of the receiver array at a measured depth 746 m, as a function of slowness and azimuth. The arrow points to the maximum, corresponding to a slowness of 295 μs/m (3400 m/s), at azimuth $\phi=68°$, and polar angle $\theta=66°$.
Figure 10B:
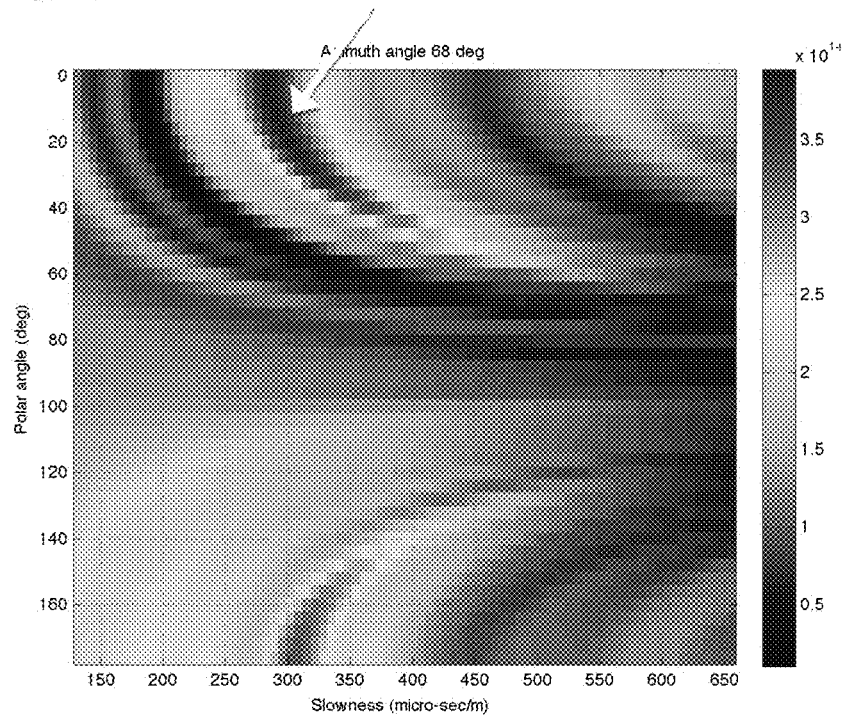
FIG. 10B: Stacking semblance related to the 4th most coherent wave-field component for the data recorded with the middle of the receiver array at a measured depth 746 m, as a function of slowness and polar angle. The arrow points to the maximum, corresponding to a slowness of 295 μs/m (3400 m/s), at azimuth $\phi=68°$, and polar angle $\theta=66°$.
Figure 10C:
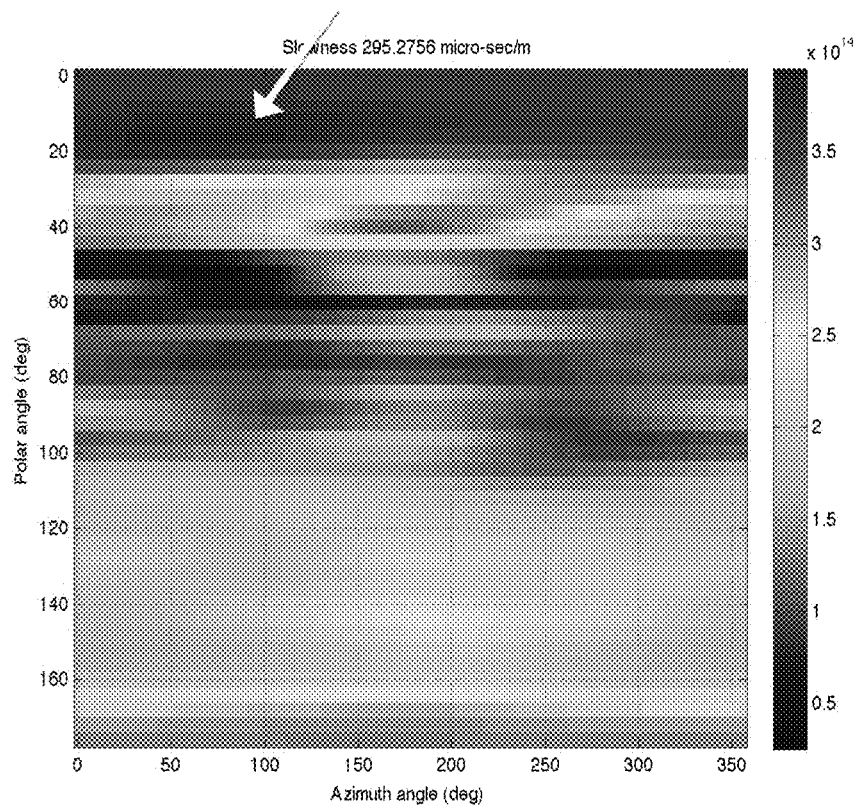
FIG. 10C: Stacking semblance related to the 4th most coherent wave-field component for the data recorded with the middle of the receiver array at a measured depth 746 m, as a function of azimuth and polar angle. The arrow points to the maximum, corresponding to a slowness of 295 μs/m (3400 m/s), at azimuth $\phi=68°$, and polar angle $\theta=66°$.
Figure 11A:
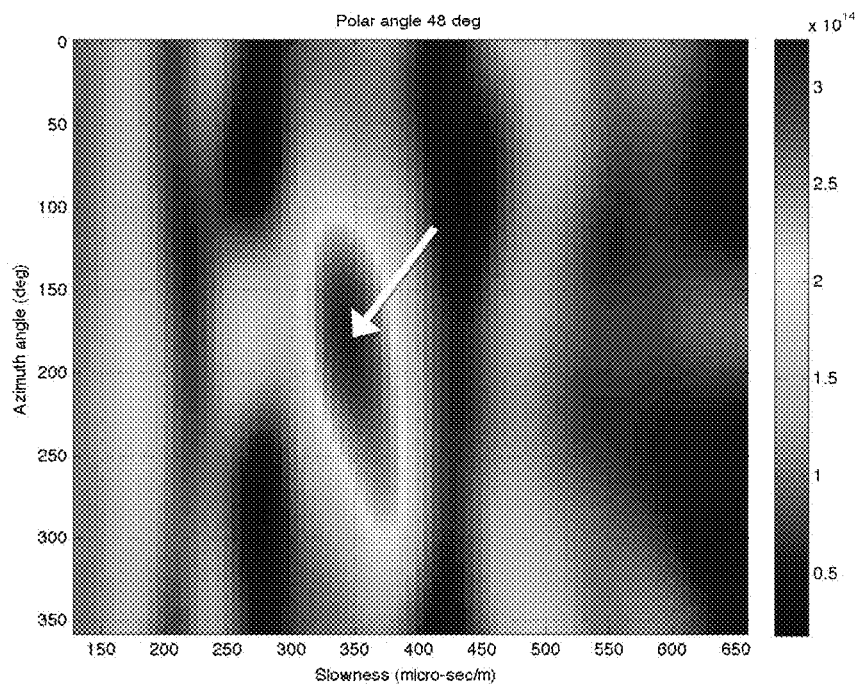
FIG. 11A: Stacking semblance related to the 5th most coherent wave-field component for the data recorded with the middle of the receiver array at a measured depth 746 m, as a function of slowness and azimuth. The arrow points to the maximum, corresponding to a slowness of 341 μs/m (2933 m/s), at azimuth $\phi=176°$, and polar angle $\theta=48°$.
Figure 11B:
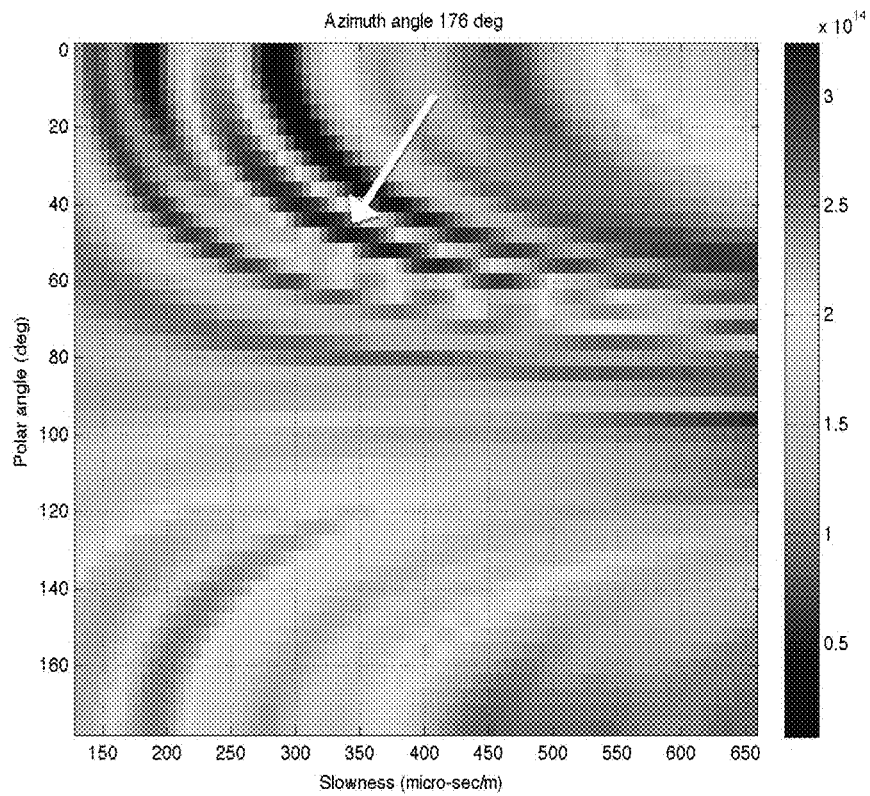
FIG. 11B: Stacking semblance related to the 5th most coherent wave-field component for the data recorded with the middle of the receiver array at a measured depth 746 m, as a function of slowness and polar angle. The arrow points to the maximum, corresponding to a slowness of 341 μs/m (2933 m/s), at azimuth $\phi=176°$, and polar angle $\theta=48°$.
Figure 11C:
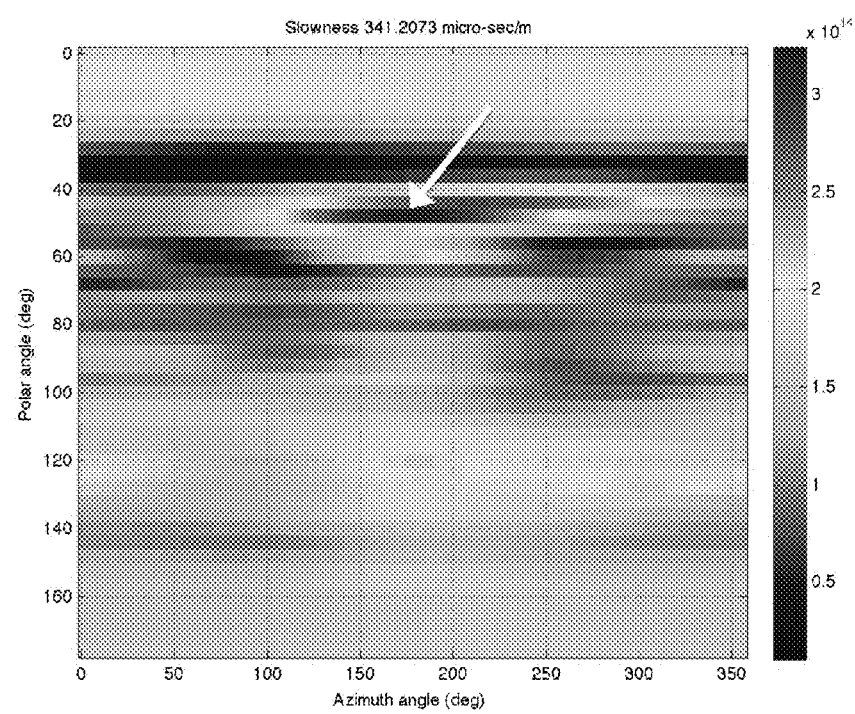
FIG. 11C: Stacking semblance related to the 5th most coherent wave-field component for the data recorded with the middle of the receiver array at a measured depth 746 m, as a function of azimuth and polar angle. The arrow points to the maximum, corresponding to a slowness of 341 μs/m (2933 m/s), at azimuth $\phi=176°$, and polar angle $\theta=48°$.

FIG. 10 shows raw data recorded over a 220 m range of measured depth by a fixed receiver. The receiver was offset from the source by 1 ft. The data are dominated by the borehole guided waves, the casing arrivals, the compressional, shear and some Stoneley waves, displaying a near-linear (or constant velocity) behavior across the fixed-azimuth data traces. The changes in the appearance of the data, should likely be associated with changes in the material behind the casing.

Figure 5:
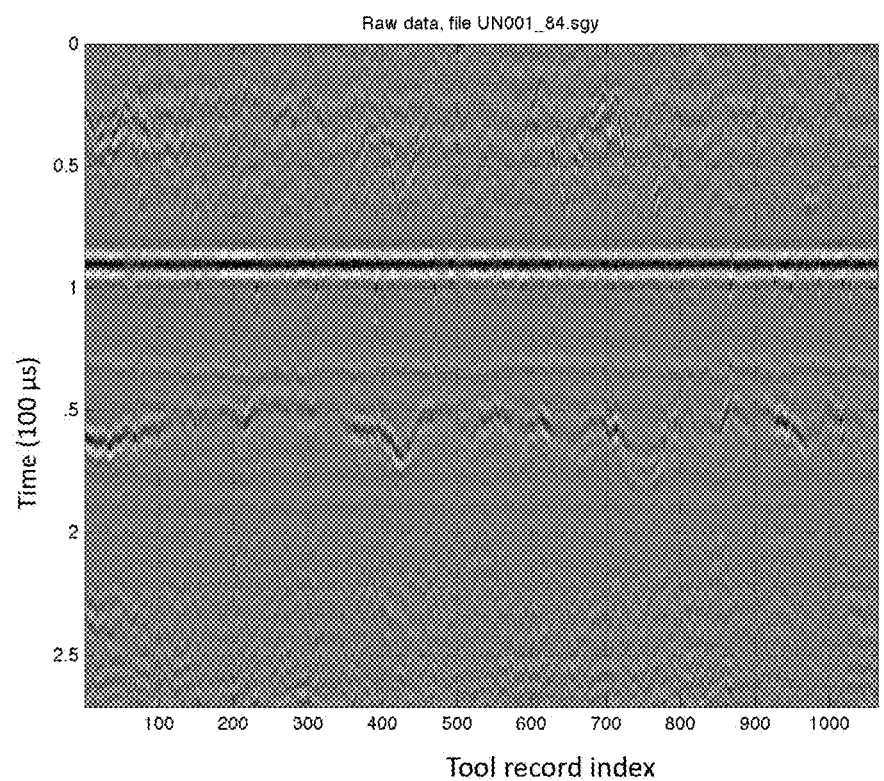
FIG. 5: Raw data from the Isolation Scanner at a fixed azimuth over a 500 ft depth interval. The signal directly refracted along the 7" casing appears to have been aligned at 100 μs. At around 150 μs, one can see reflections/refractions from a second interface.

FIG. 5 shows raw field data acquired at a fixed azimuth by the Isolation Scanner© over a 500 ft depth interval. The data were acquired from the inside of a 7-in casing, which in turn was inside of a 9⅝-in casing. The signal directly refracted along the 7-in casing appears to have been aligned at 100 µs. At around 150 one can see reflections/refractions from the next 9⅝-in casing.

Figure 6A:
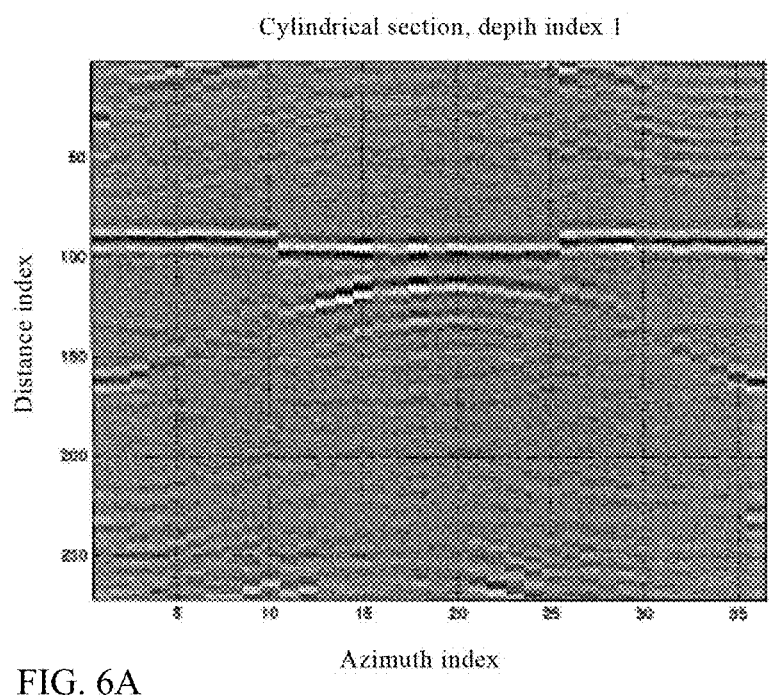
FIG. 6A: Data from the Isolation Scanner at a fixed depth. The 36 records are one for each ten degrees around the azimuth of the well.
Figure 6B:
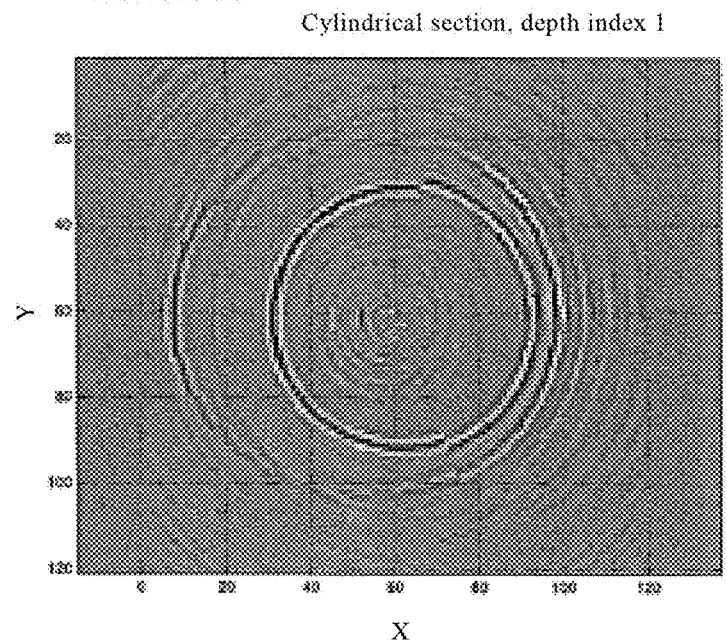
FIG. 6B: Data from the Isolation Scanner at a fixed depth. The same traces of FIG. 6A as a 10°-segmented radial fan.

In FIG. 6, we again show data from Isolation Scanner at a fixed depth. The 36 records in FIG. 6A are one for each ten degrees around the azimuthal perimeter of the well. In FIG. 6B, we have displayed the same traces as a 10°-segmented radial fan.

The data in FIGS. 5 and 6 are shown in reflection time versus depth or azimuth angle. In a later segment of this report, we will see how these displays are transformed to spatial images.

In the following we will analyze methods for separating highly overlapping components of the well-bore wave field, and explore how the separated wave-field components can be used for imaging the well and its immediate surroundings.

Plane-Wave Decomposition

The near-linear increase in arrival times for the direct arrivals with increasing source-receiver offset in FIG. 4, indicates that the these components of the wave field each may be approximated by a plane wave:

$$A_j(x,\tau_{jx},\omega)=g_j(x,\omega)e^{i\omega\tau_{jx}} \quad [1]$$

where the amplitude factor $g_j(x,\omega)$ describes the wave-component j, affected by wave-field spreading and absorption, $\omega$ denotes the angular frequency, and $\tau_{jx}$ is the travel time for wave-field component j from the source at 0 to the receiver at location x. This travel time can be written as $\tau_{jx}=s_j \cdot x$ where is the slowness vector (inverse velocity) for the propagating wave. Ignoring the spatial variations in the wave-field function by setting $g_j(x,\omega)=(\omega)$, we can rewrite Equation [1]:

$$A_j(x,s_j,\omega)=g_j(\omega)e^{i\omega s_j \cdot x} \quad [2]$$

A set of data traces D recorded at receiver $r_n$ at a given source-receiver offset $x_n$, can be written as a superposition of the elemental wave-field components:

$$D_{r_n}(\omega) = \sum_j A_j(x_n, s_j, \omega) \quad [3]$$
$$= \sum_j g_j(\omega)e^{i\omega s_j \cdot x_n}$$

In order to get simultaneous, unbiased estimates of $g_j(\omega)$, one could invert Equation [3] by using a method similar to the one described by Hirabayashi et al. (2008). However, for the purpose of testing the concept, we have estimated the set of parameters for one wave-field component at the time, starting with the most coherent. The propagation time for wave-field component k from the source at 0 to the receiver at x is equal to $s_k \cdot x$. By shifting all data traces D by $s_k \cdot x$, the reference time for wave-field component k will refer to the time of the emission from the source (at $\tau=0$), all receivers will have copies of the propagating, elemental wave field $g_k(\omega)$, aligned to the time of emission at the source. At this reference time, we have:

$$D^k_{r_n}(\omega) = e^{-i\omega s_k \cdot x_n} D_{r_n}(\omega) \quad [4]$$
$$= e^{-i\omega s_k \cdot x_n} \sum_j g_j(\omega)e^{i\omega s_j \cdot x_n}$$
$$= \sum_j g_j(\omega)e^{i\omega(s_j-s_k)\cdot x_n}$$
$$= g_k(\omega) + \sum_{j\neq k} g_n(\omega)e^{i\omega(s_j-s_k)\cdot x_n}$$

Summing over the N receivers, we get:

$$\sum_n D^k_{r_n}(\omega) = Ng_k(\omega) + \sum_n \sum_{j\neq k} g_j(\omega)e^{i\omega(s_j-s_k)\cdot x_n} \quad [5]$$
$$= Ng_k(\omega) + \sum_{j\neq k} g_j(\omega)e^{i\omega(s_j-s_k)\cdot x_n}$$

If we require that the propagators for the plane-wave components are approximately orthogonal, in the sense that for $j\neq k$, we have:

$$\sum_n e^{i\omega(s_j-s_k)\cdot x_n} \approx 0 \quad [6]$$

With this condition, we get estimates of the wave-field components $g_k(\omega)$ by time delaying and stacking:

$$\hat{g}_k(\omega) = \frac{1}{N}\sum_n D^k_{r_n}(\omega) = \frac{1}{N}\sum_n e^{i\omega s_k \cdot x_n} D_{r_n}(\omega) \quad [7]$$

Considering the difference in propagation slowness $|s|$ for the elemental wave forms (mainly compressional, shear and Stoneley), the condition imposed by Equation [6] should be good. However, this condition could also be adversely affected by the spatial and temporal aliasing.

The stacking power for the aligned data as a function of velocity, polar angle $\theta$, and azimuth angle $\phi$ is:

$$P_k(s, \theta, \varphi) = P'_k(s) = \sum_\omega |\hat{g}_k(\omega)|^2 \quad [8]$$

Accordingly, the semblance is given by:

$$S_k(s, \theta, \varphi) = \frac{\sum_\omega |\hat{g}_k(\omega)|^2}{\frac{1}{N}\sum_{n,\omega}|D_{r_n}(\omega)|^2} \quad [9]$$

The objective would then be, for each elemental wave-field component k, to find the set of parameters s, $\theta$ and $\omega$ that maximizes the power $P_k(s,\theta,\phi)$ or the semblance $S_k(s,\theta,\phi)$. The linear move-outs of the wave-field components seen in the fixed-azimuth data in FIG. 4 suggest that we can find a solution to this estimation problem by using a two-step process whereby first the component of the propagation slowness along the axis of the tool is found. This component, the "phase slowness", is given by $s_z=|s|\cos(\theta)$, with $\theta$ being the polar angle (which we define as the angles with the axis of the tool). Following this we can map the stacking semblance as a function of $\theta$ and $\phi$ for the estimated value of $s_z$.

The "wave-field stripping process" starts with the wave-field giving the highest semblance value. Having established the parameters for wave-field component 1, we estimate this using either Equation [8] or [9], and remove it. On the residuals, we find the most coherent wave field, etc. By repeating this process 4 times, we find estimates of the 5 most coherent wave-field components (in hierarchical order).

Reflection-Point Mapping

Up to this point, we have made no use of absolute travel times. However, with our estimates of formation velocities, and propagation directions for scattered waves, the travel times will tell the distance to the scatterers.

Let us assume we have a constant-velocity medium at velocity $v_l$ and that a wave is generated by a source at point s, scattered at point x and arriving at the receiver at point r at time t. It is well-known from migration theory that x lies on an ellipsoid with the source and receiver at its focal points (see, e.g., Miller et al, 1987). The generator for the ellipsoid is vt, the medium velocity multiplied by the total travel time.

From our measurements, we also know the direction from the receiver towards the scattering point. Pointing back into the formation along the direction the scattered wave arrived, at the azimuth determined above, the scattering point is offset from the mid-point between source and receiver by:

$$\Delta_A = \frac{-D_n \sin^2\theta \pm \sqrt{(D_n\sin^2\theta)^2 + (vt)^2\left(1 - \left(\frac{D_n}{vt}\right)^2\cos^2\theta\right)\left(\cos^2\theta - \left(\frac{D_n}{vt}\right)^2\right)}}{2\left(1 - \left(\frac{D_n}{vt}\right)^2\cos^2\theta\right)} \quad [10]$$

at a distance from the wellbore axis of:

$$\Delta_T = \left(\frac{D_n}{2} + \Delta_A\right)\tan\theta \quad [11]$$

Here, the parameters v and θ are obtained from the plane-wave analysis in the previous section.

Refraction Mapping

The borehole wall is generally associated with a propagating velocity for acoustic waves $v_s$ that is larger than the propagation velocity in the fluid $v_l$ (which generally is around 1500 m/s). We have a relation between the distance d to the wall of the well and the travel time $t_n$ for a direct, refracted wave travelling along the borehole wall from the source to the receiver n offset by a distance $D_n$, with $D_n \gg d$, from the source:

$$t_n = 2\frac{d}{v_1}\sqrt{1 - \left(\frac{v_1}{v_S}\right)^2} + \frac{D_n}{v_s} \quad [12]$$

Here $v_s$ and $v_l$ are the propagation velocities in the formation and in the fluid-filled wellbore, respectively, assuming that $v_l < v_s$, and that both the source and receivers are at the same distance from the wall. This can be solved for the distance to the borehole wall:

$$d = \frac{1}{2}\frac{(v_S t_n - D_n)}{\sqrt{\left(\frac{v_S}{v_1}\right)^2 - 1}} \quad [13]$$

This equation gives a mapping directly from travel time to distance away from the tool face. Knowing the distance from the centre of the wellbore to the transmitter and receiver faces, Equation [13] gives a direct measure of the casing radius. We will use this equation to make an image of the borehole wall. However, with a fluid-filled annulus (like in FIG. 1), it is important to realize that this same formula also relates the travel times and the distance to the second and third interfaces, meaning that we can use this relationship to make images of these interfaces.

With a tool with arbitrary centralization in the wellbore, from Equation [13] one can find the difference Δy in the fluid thickness at opposite sides of the tool:

$$\Delta y = \frac{\Delta t}{2}\frac{v_S}{\sqrt{\left(\frac{v_S}{v_1}\right)^2 - 1}} \quad [14]$$

where Δt is the delay between wave-field arrivals at two opposing sides of the tool. Measured by the wave-front tilt θ, the maximum difference in fluid thickness becomes:

$$\Delta y = \frac{r\tan\theta}{\sqrt{\left(\frac{v_S}{v_1}\right)^2 - 1}} \quad [15]$$

where r is the average of the two distances, or typically half the difference between the well diameter and tool diameter. For fixed values of r and Δy, the tilt angle is approximately proportional to the square root of the difference between the formation and the well-fluid velocities.

Wave-Field Decomposition, Application to Field Data, Sonic Scanner

Figure 7A:
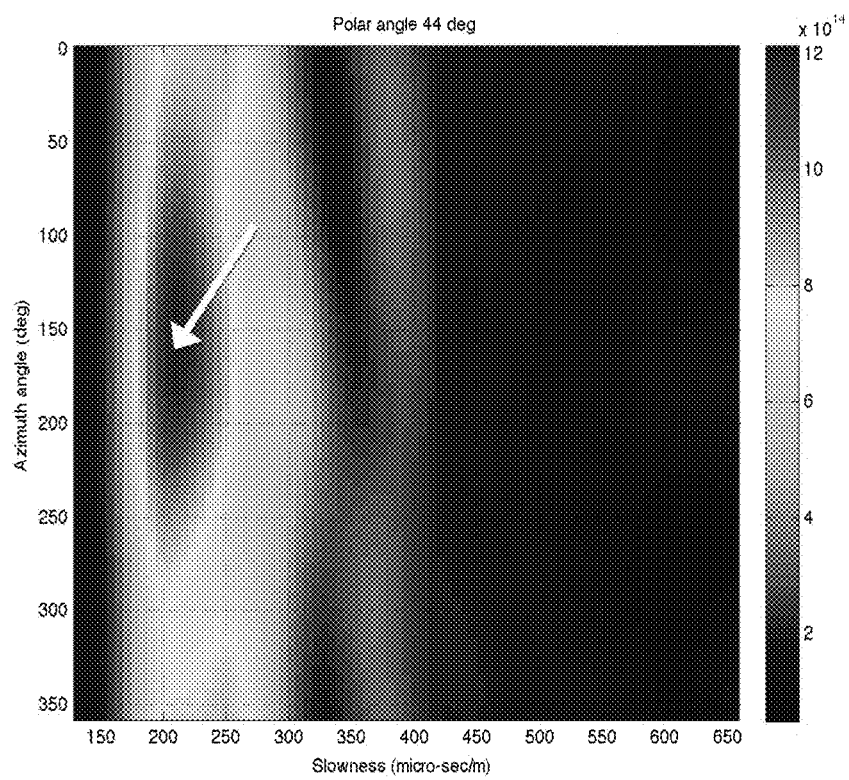
FIG. 7A: Stacking semblance related to the most coherent wave-field component for the data recorded with the middle of the receiver array at a measured depth 746, as a function of slowness and azimuth. The arrow points to the maximum, corresponding to a slowness of 210 μs/m (4750 m/s), at azimuth $\phi=156°$, and polar angle $\theta=44'$.
Figure 7B:
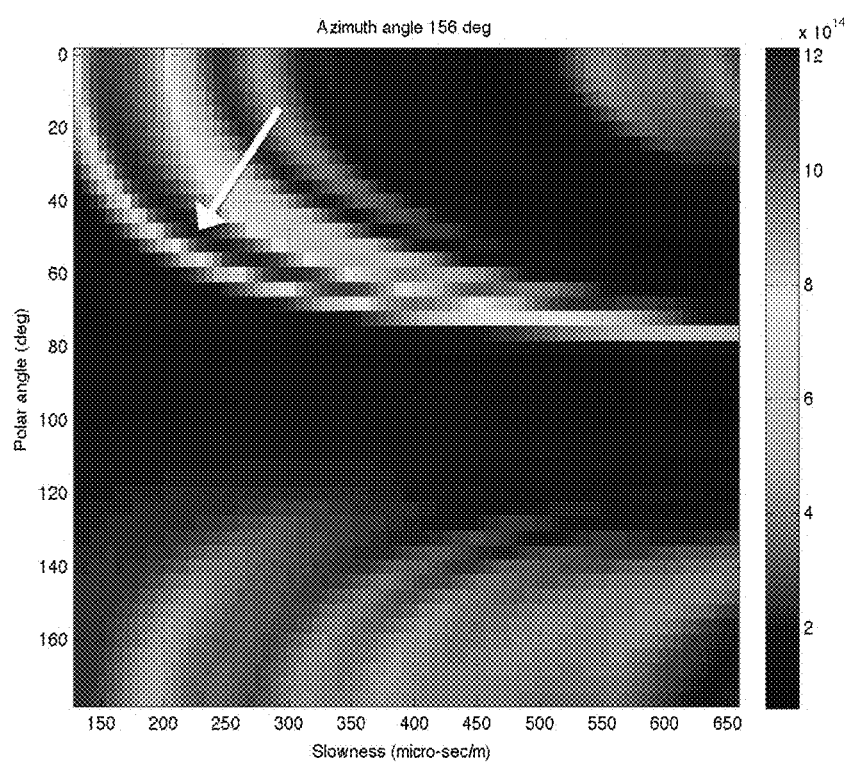
FIG. 7B: Stacking semblance related to the most coherent wave-field component for the data recorded with the middle of the receiver array at a measured depth 746, as a function of slowness and polar angle. The arrow points to the maximum, corresponding to a slowness of 210 μs/m (4750 m/s), at azimuth $\phi=156°$, and polar angle $\theta=44°$.
Figure 7C:
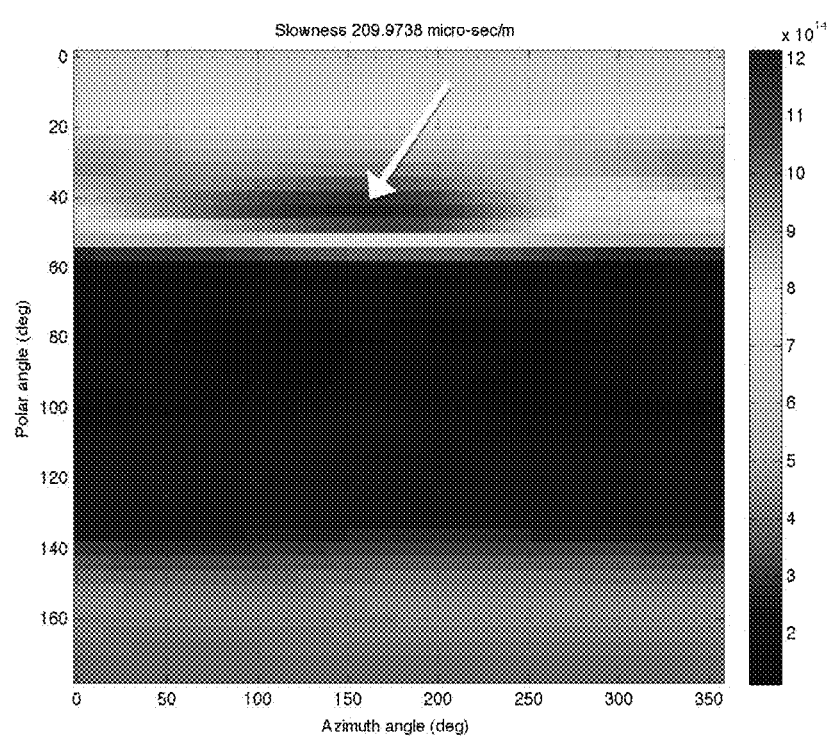
FIG. 7C: Stacking semblance related to the most coherent wave-field component for the data recorded with the middle of the receiver array at a measured depth 746, as a function of azimuth and polar angle. The arrow points to the maximum, corresponding to a slowness of 210 μs/m (4750 m/s), at azimuth $\phi=156°$, and polar angle $\theta=44°$.
Figure 8A:
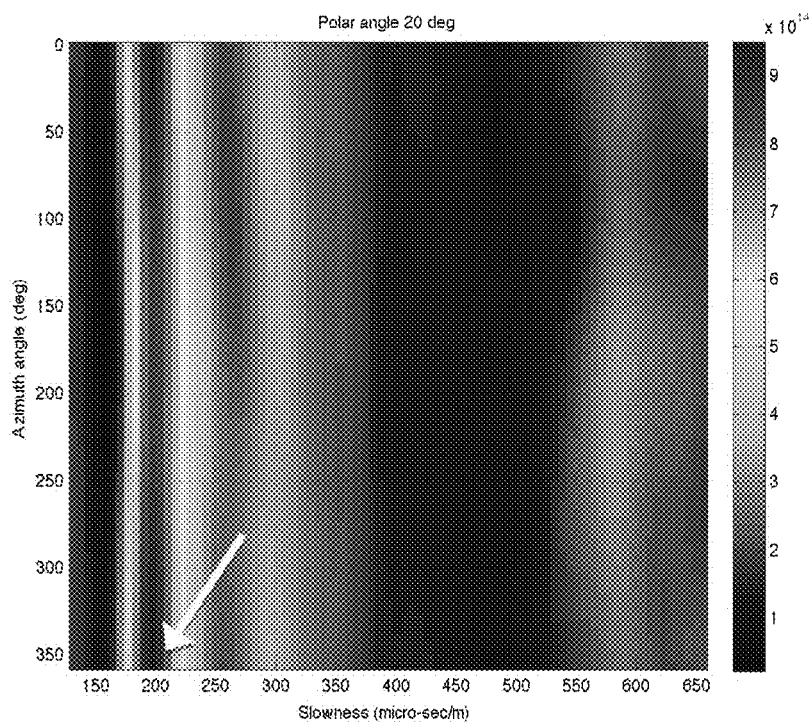
FIG. 8A: Stacking semblance related to the 2nd most coherent wave-field component for the data recorded with the middle of the receiver array at a measured depth 746 m, as a function of slowness and azimuth. The arrow points to the maximum, corresponding to a slowness of 197 ms/m (5076 m/s), at azimuth $\phi=352°$, and polar angle $\theta=20°$.
Figure 8B:
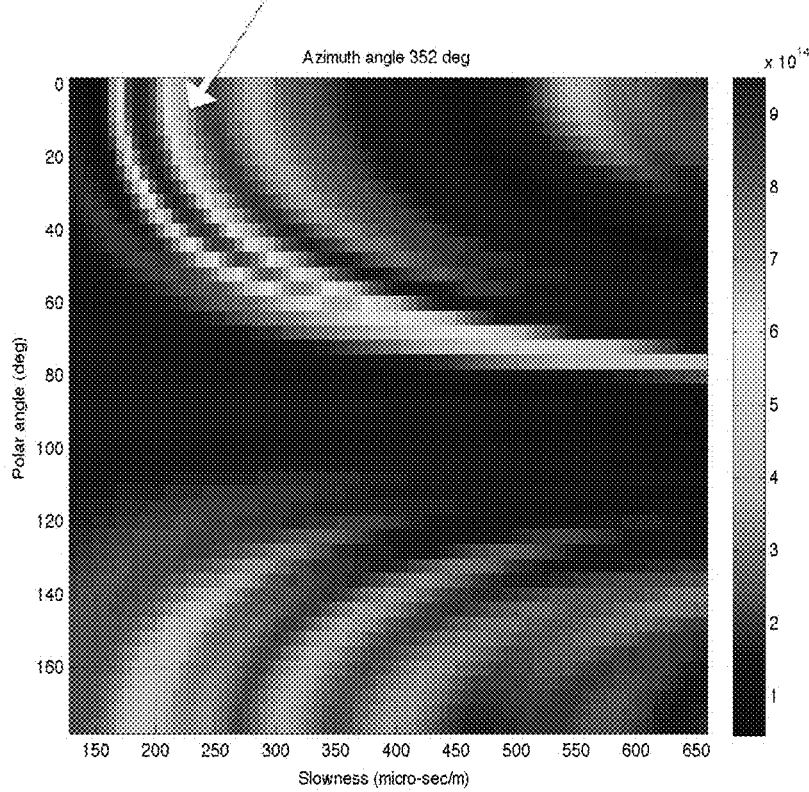
FIG. 8B: Stacking semblance related to the 2nd most coherent wave-field component for the data recorded with the middle of the receiver array at a measured depth 746 m, as a function of slowness and polar angle. The arrow points to the maximum, corresponding to a slowness of 197 μs/m (5076 m/s), at azimuth $\phi=352°$, and polar angle $\theta=20°$.
Figure 8C:
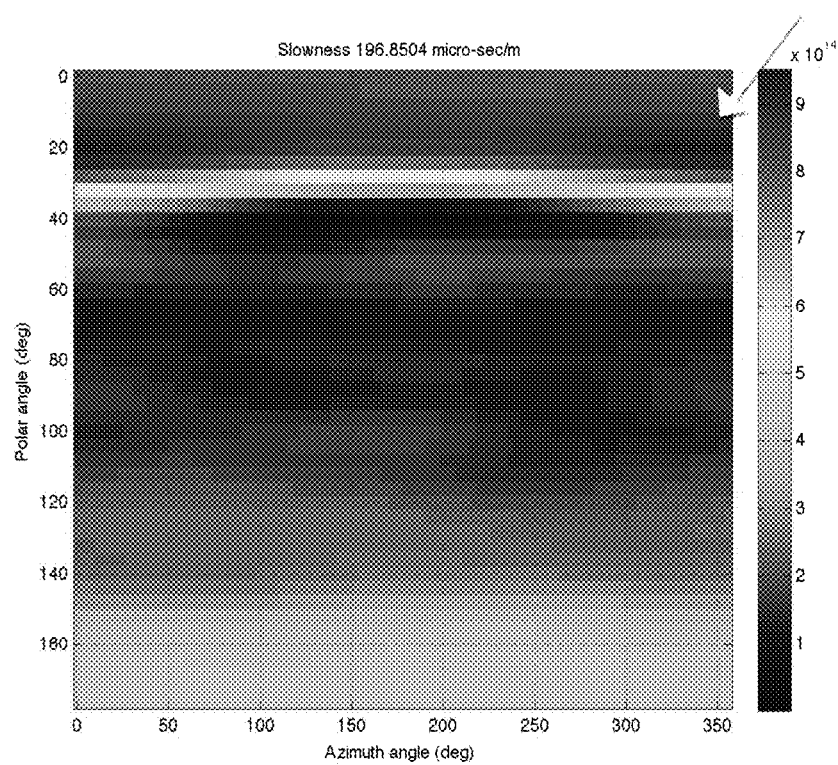
FIG. 8C: Stacking semblance related to the 2nd most coherent wave-field component for the data recorded with the middle of the receiver array at a measured depth 746 m, as a function of azimuth and polar angle. The arrow points to the maximum, corresponding to a slowness of 197 μs/m (5076 m/s), at azimuth $\phi=352°$, and polar angle $\theta=20°$.
Figure 9A:
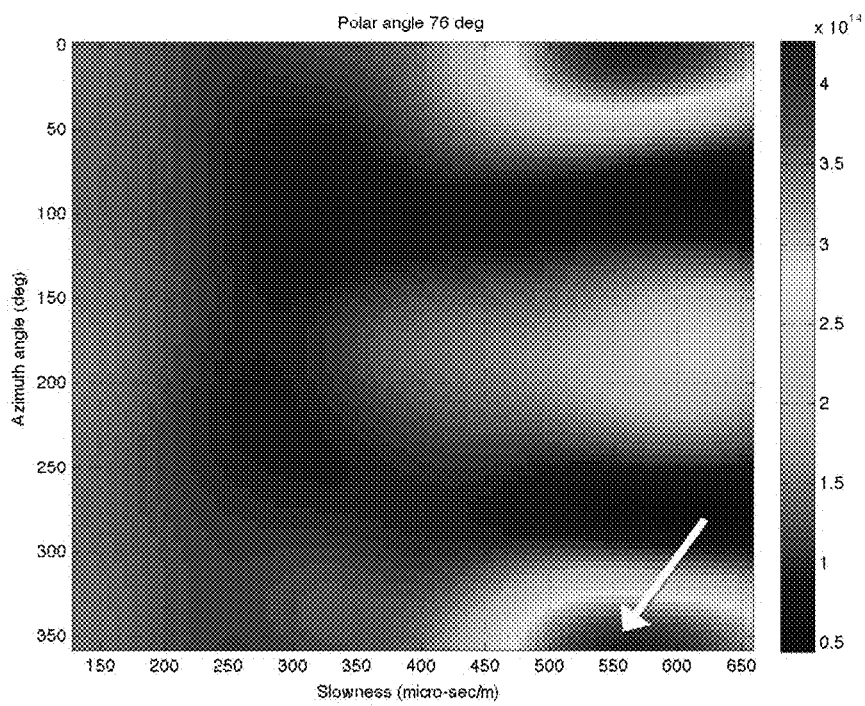
FIG. 9A: Stacking semblance related to the 3rd most coherent wave-field component for the data recorded with the middle of the receiver array at a measured depth 746 m, as a function of slowness and azimuth. The arrow points to the maximum, corresponding to a slowness of 565 μs/m (1750 m/s), at azimuth $\phi=0°$, and polar angle $\theta=76°$.
Figure 9B:
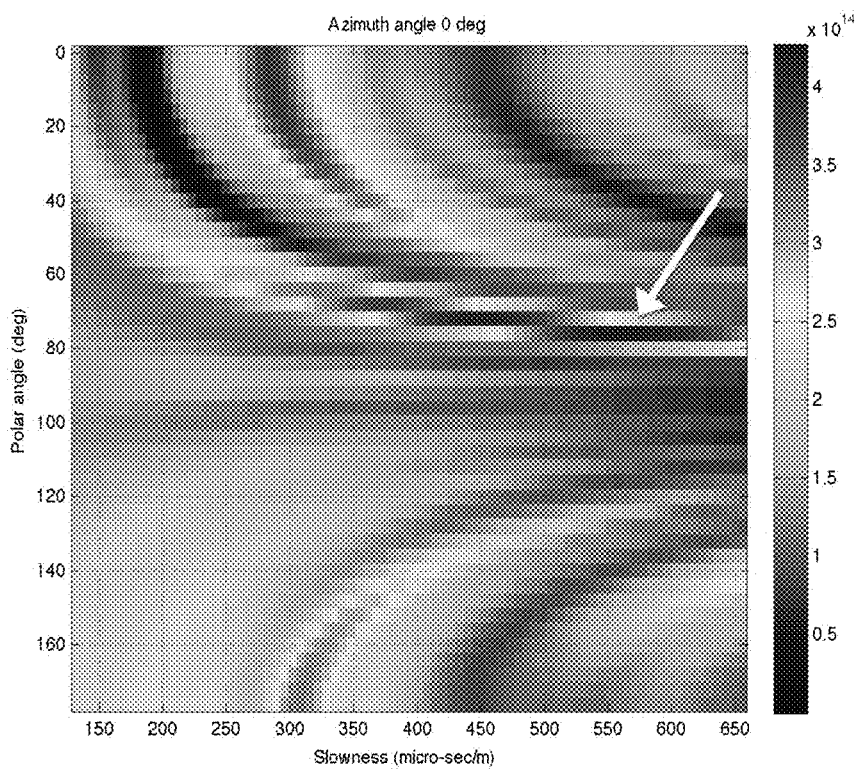
FIG. 9B: Stacking semblance related to the 3rd most coherent wave-field component for the data recorded with the middle of the receiver array at a measured depth 746 m, as a function of slowness and polar angle. The arrow points to the maximum, corresponding to a slowness of 565 μs/m (1750 m/s), at azimuth $\phi=0°$, and polar angle $\theta=76°$.
Figure 9C:
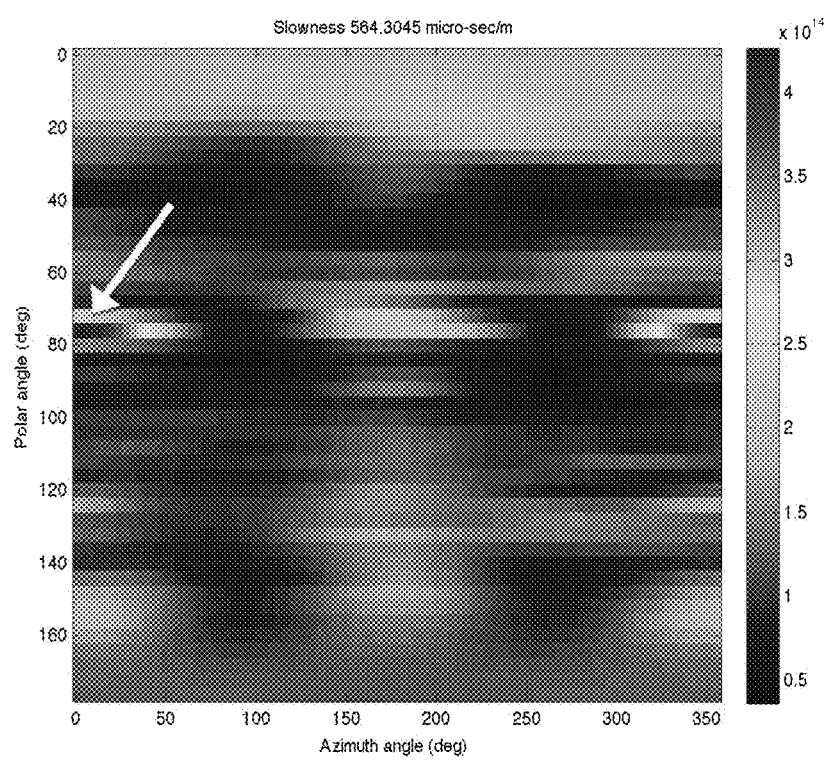
FIG. 9C: Stacking semblance related to the 3rd most coherent wave-field component for the data recorded with the middle of the receiver array at a measured depth 746 m, as a function of azimuth and polar angle. The arrow points to the maximum, corresponding to a slowness of 565 μs/m (1750 m/s), at azimuth $\phi=0°$, and polar angle $\theta=76°$.

For the data shown in FIG. 4, at a measured depth of 742 m, in FIG. 7 we show the stacking semblance as a function of slowness and azimuth, of azimuth and polar angle, and of slowness and polar angle. The highest semblance value is for a slowness 210 μs/m (4750 m/s), at azimuth ϕ=156°, and polar angle θ=44°, corresponds to the direct shear. The reason why it appears to be from a specific azimuth and polar angle is most likely because the tool is not perfectly centered in the well. The smearing of the plot of polar angle versus slowness along a hyperbolic curve, is along a fixed phase velocity.

Having established the parameters for wave-field component 1, we estimate this wave field using Equation 8, and remove it. On the residuals, we find the next most coherent wave field, etc. This process is repeated 4 times, giving estimates of the 5 most coherent components of the wave field (in hierarchical order). FIGS. 8, 9, 10, and 11, respectively, show the stacking semblance for the $2^{nd}$, $3^{rd}$, $4^{th}$ and $5^{th}$ most coherent wave fields. The estimated parameters for these wave fields are summarized in Table 1, below.

TABLE 1

Parameters describing the 5 most coherent wave-field components for the data acquired at 743 m from the top of the recording interval

| | Wave-field hierarchy | | | | |
|---|---|---|---|---|---|
| | #1 | #2 | #3 | #4 | #5 |
| Velocity (m/s) | 4750 | 5076 | 1750 | 3400 | 2933 |
| Azimuth (degrees) | 156 | 352 | 0 | 68 | 176 |
| Polar angle (degrees) | 44 | 20 | 76 | 16 | 48 |

Figure 12A:
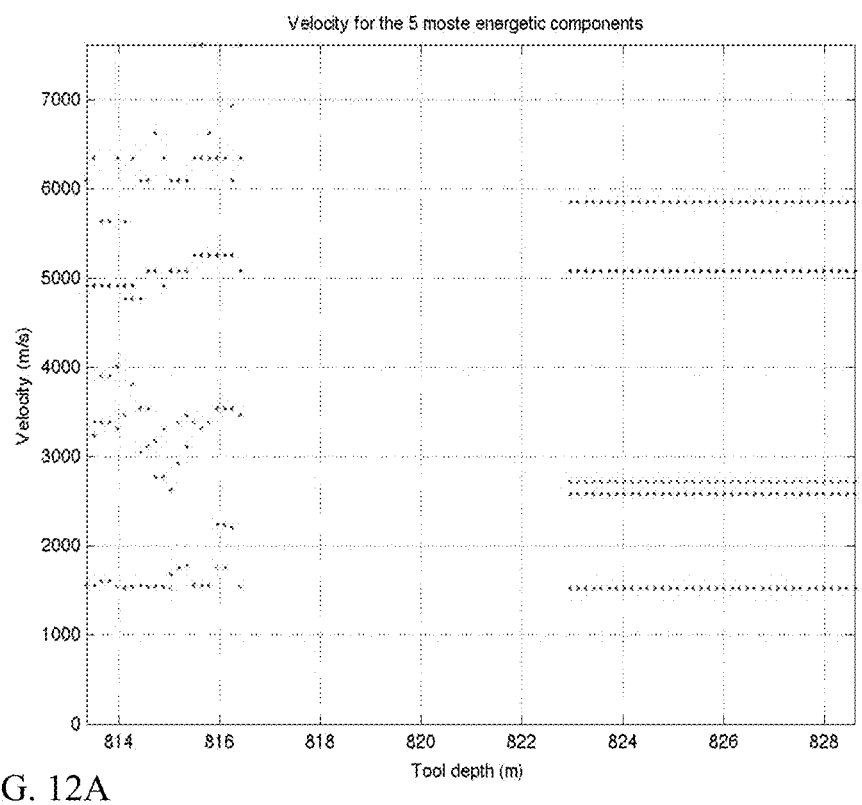
FIG. 12A: Velocities for the shallowest few records. The one with a velocity around 1500 m/s is most likely a Stoneley mode, the one around 3300 the Shear and the one around 5000 the compressional.
Figure 12B:
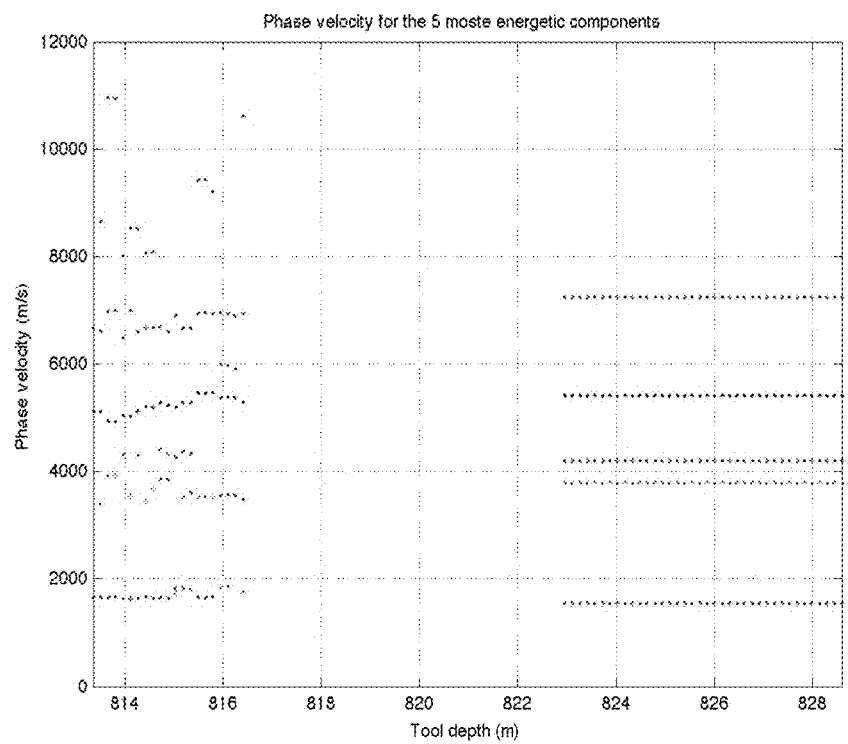
FIG. 12B: Phase velocities for the shallowest few records. The larger phase velocities indicate a modest tool eccentering.

FIG. 12 shows the velocities and phase velocities for the shallowest few records below 746 m. The component with a velocity around 1500 m/s is most likely a Stoneley mode, the component with velocity around 3300 is most likely the Shear and the one with velocity around 5000 is most likely the compressional. The larger phase velocities for these components indicate a modest tool eccentering.

Wave-Field Stripping, Application to Field Data, Sonic Scanner

The "wave-field stripping process" proceeds according to the above, starting with the wave field giving the highest semblance value. Having established the parameters for wave-field component 1, we estimate this using Equation 8, and remove it. On the residuals, we find the most coherent wave field, etc. This process was repeated 4 times, giving estimates of the 5 most coherent components of the wave field (in hierarchical order).

Figure 13:
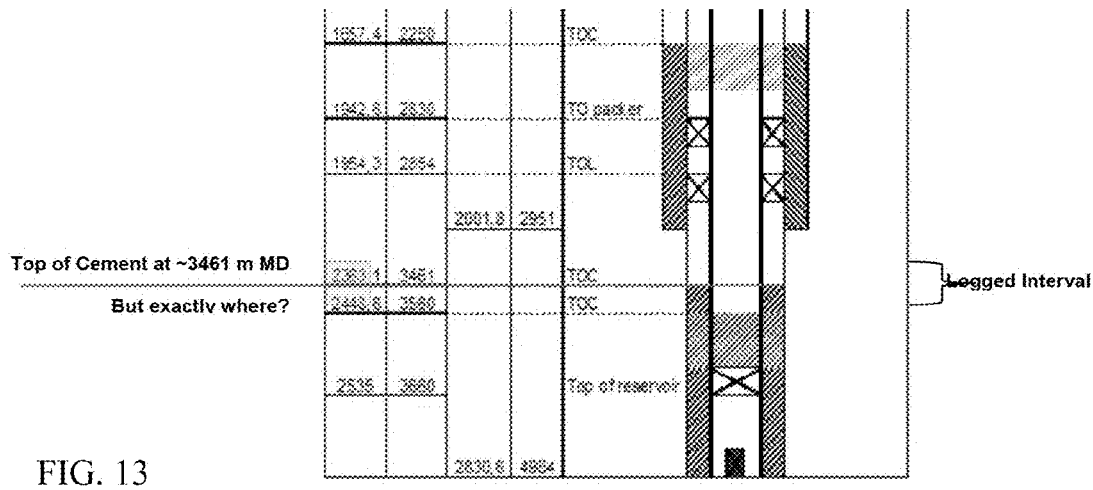
FIG. 13: Schematic layout of the well being investigated.
Figure 14:
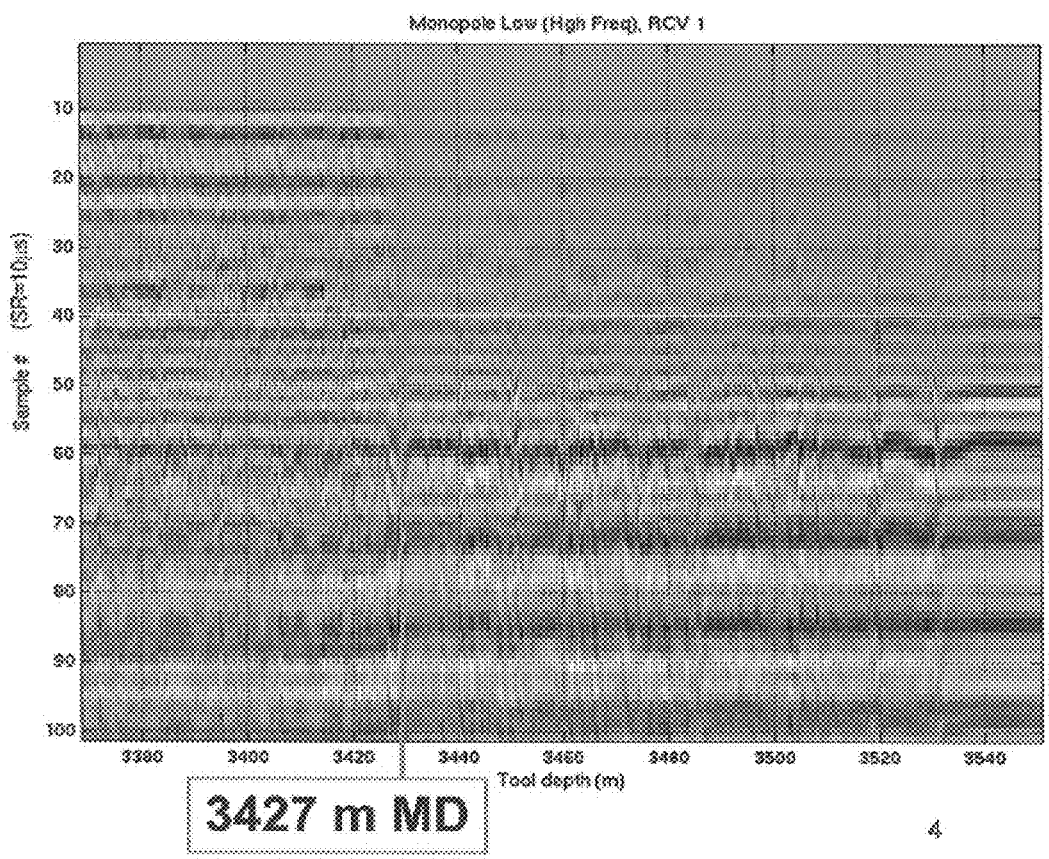
FIG. 14: Data acquired with the Sonic Scanner from inside 7" casing in the depth interval indicated on FIG. 15.

We have applied this decomposition technique to data acquired in the well schematically described in FIG. 13. The data were acquired by the Schlumberger Sonic Scanner tool, using the CBL-setting of the tool. In this mode, the tool records data from all 8 azimuths, but only the 5 receiver rings nearest to the source. The operating frequency in this mode is 25 kHz. The 175 m interval over which the data shown in FIG. 14 were acquired is indicated with a yellow marker in the schematics. The data were acquired from within a 7" casing with the objective is to see behind the casing.

The data show a rather obvious and significant change in character at a depth (MD) of 3427 m, above which the amplitude for the earliest arrival increases abruptly. It is natural to assume that this is where the cement ends between the 7" casing and the formation, 34 m above the 3461 m indicated on FIG. 13.

Figure 15:
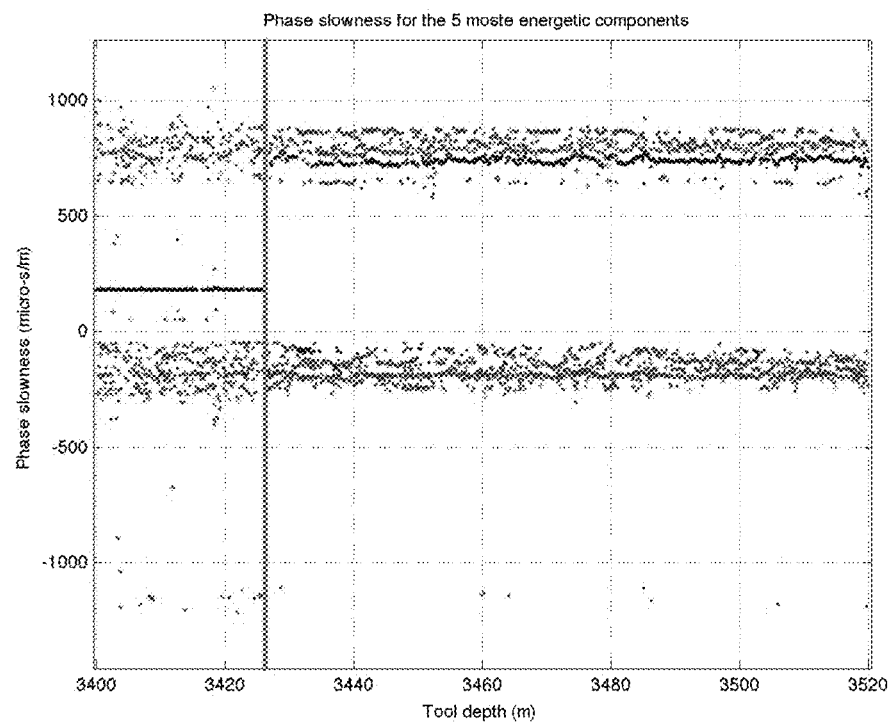
FIG. 15: Phase slowness versus depth for 5 most energetic wave forms for the data shown in FIG. 16. Blue indicates the most energetic waveform.
Figure 16:
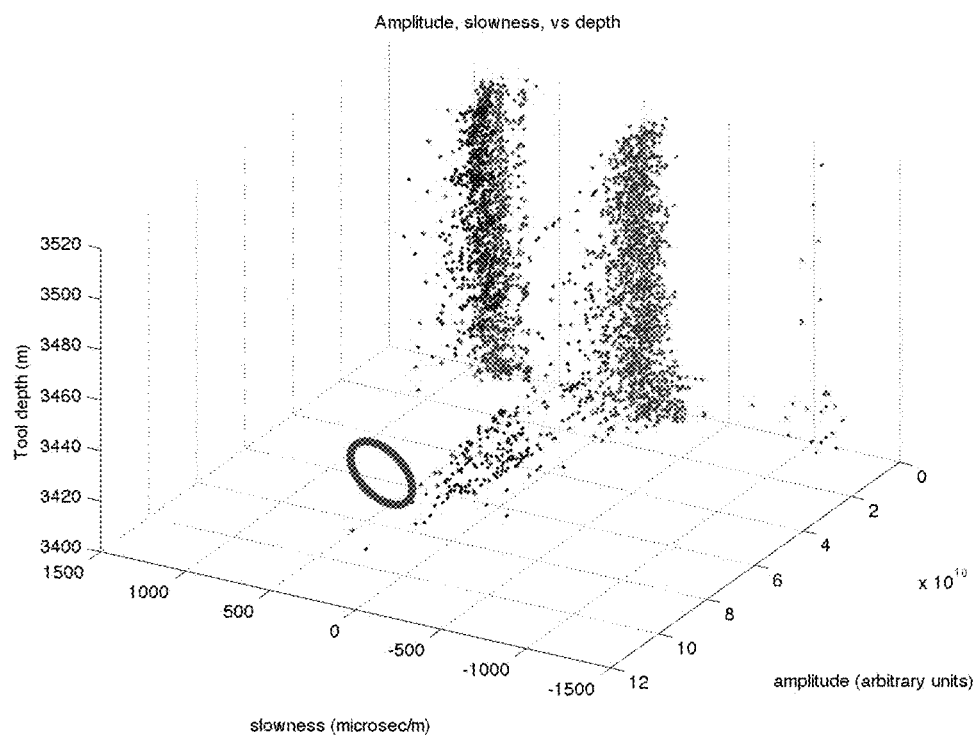
FIG. 16: Amplitude versus slowness and depth, showing that the casing arrival (within the red oval shape) becomes significant from a specific depth (3427 m)

This change is further confirmed by the wave-field decomposition analysis, the results of which are summarized in FIGS. 15 and 16. The figures show the phase slowness (inverse of velocity) for the 5 most energetic plane waves. Deeper than 3427 m, the Stoneley is the most energetic component. Above 3427 m, the most energetic component runs at 181±3 µs/m, or a velocity of 5525±100 m/s—the compressional (extensional) velocity in steel. From FIG. 16, it is clear that at depths shallower that 3427 m, the steel-compressional wave is by far the strongest. It is almost like hitting a resonating bell when there is no cement behind the casing.

Refraction Imaging, Application to Field Data, Isolation Scanner

Figure 17:
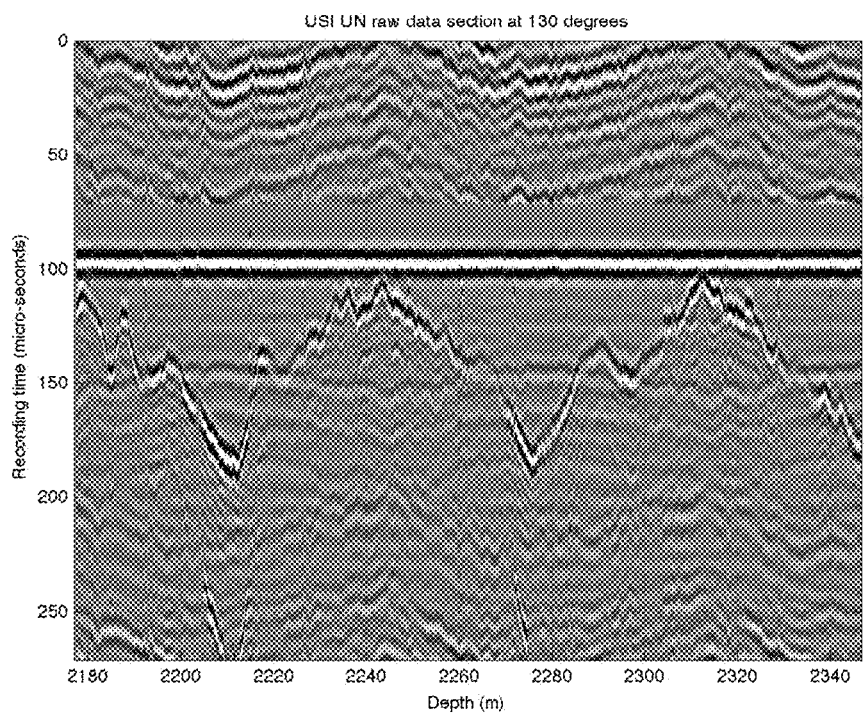
FIG. 17: Raw data acquired by the Isolation Scanner. The data, sampled at 1 µs, has clearly been aligned by placing the reflection from the 7-in casing at 100 µs. This time shifting has been done in a circular fashion such that data that is shifted off the record at the end of the data, reappears at early times.

Isolation Scanner acquires data at frequencies between 200 and 500 kHz. The data we show in FIG. 17, acquired in the same well (FIG. 13) as the Sonic Scanner data discussed in the previous section, but at a shallower depth, across what was assumed to be the top of the cement outside the 9⅝-in casing at 2250 m (MD). The data, sampled at 1 µs has clearly been aligned by placing the reflection from the 7-in casing at 100 µs. This time shifting appears to have been done in a circular fashion such that data that is shifted off the record at the end of the data, reappears at early times. This is what you will get if you are using a frequency-domain operator to shift the data. This rather is convenient in that the original data are easily reconstructed by the reverse operation.

The event meandering between the 100 and 180 µs has most likely been refracted along the 9⅝-in casing, indicating that this casing is touching the 7-in casing at several points, at around 2180 m, 220 m and 2310 m, along the 160 m long depth interval.

Figure 18:
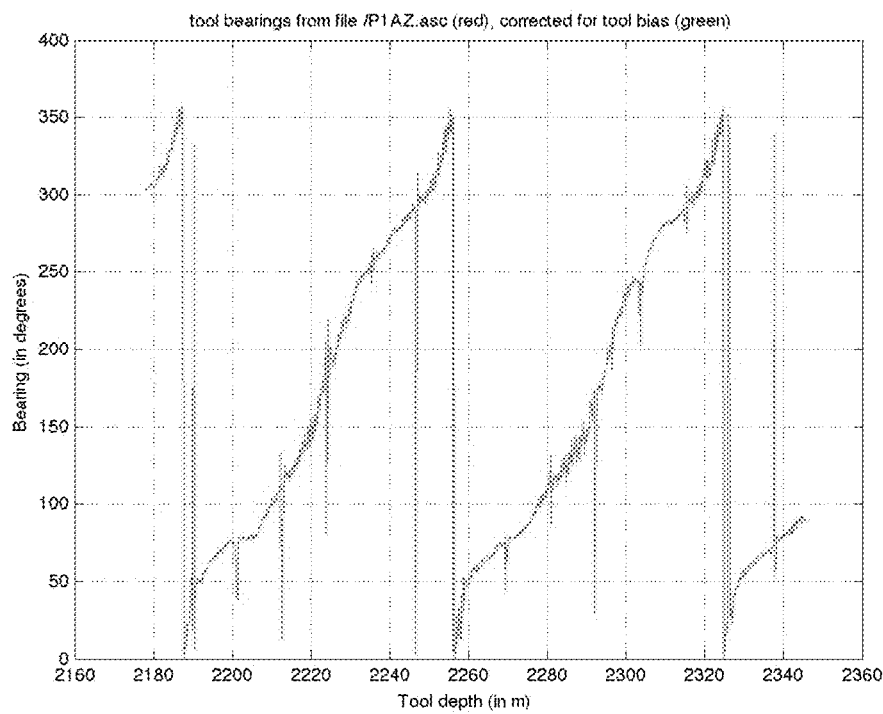
FIG. 18: The relative bearing of the tool, showing that the tool rotated about 3 full rotations over the 160 m depth interval.

From FIG. 18, showing the relative bearing of the tool, it appears that the tool itself made 3 full rotations over the 160 m long interval.

This complete dataset has been migrated, using Equations [12] and [13]. In accordance with Zeroug and Froelich (2003) we assume that the dominant mode, relevant to our objectives, excited in the 7-in pipe is flexural with a propagation velocity of 3240 m/s. For the fluid velocity, we used a value of 1480 m/s. Unfortunately the two receivers available for the Isolation Scanner does not allow us to use the higher-resolution estimation of these velocities, like we could do for the Sonic Scanner data.

Figure 19:
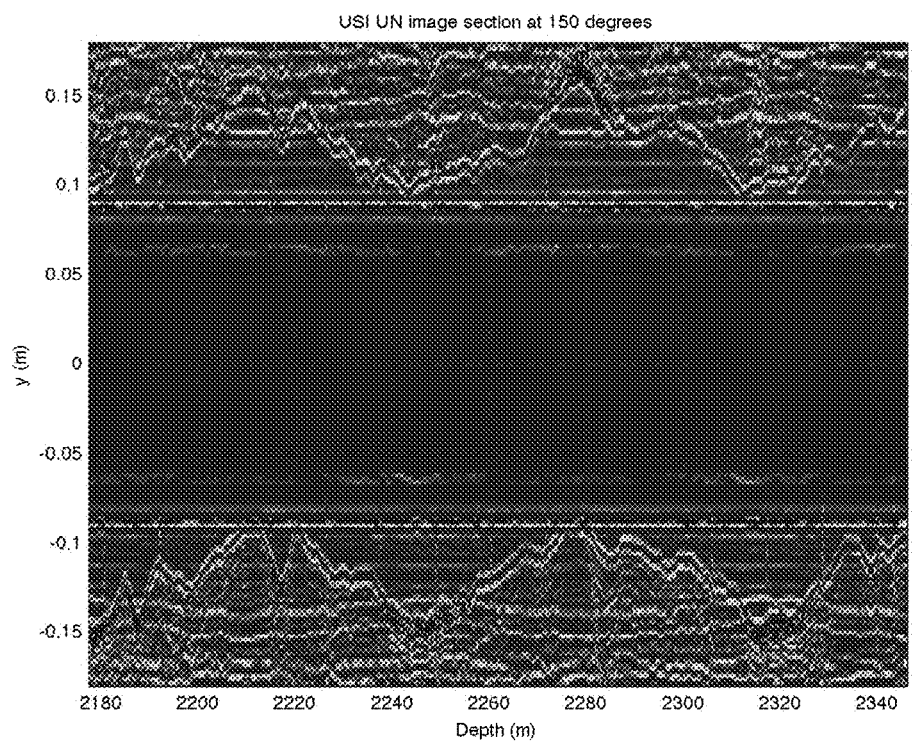
FIG. 19: Migrated image showing distance away from the center of the well, as a function of depth along the well. Notice that whiles the aspect ration of this figure is about 1:300.

A sector of the migrated image is shown in FIG. 19. The display shows the distance away from the center of the well, as a function of depth along the well. (Please, notice that the aspect ration of this figure is about 1:300.)

Figure 20:
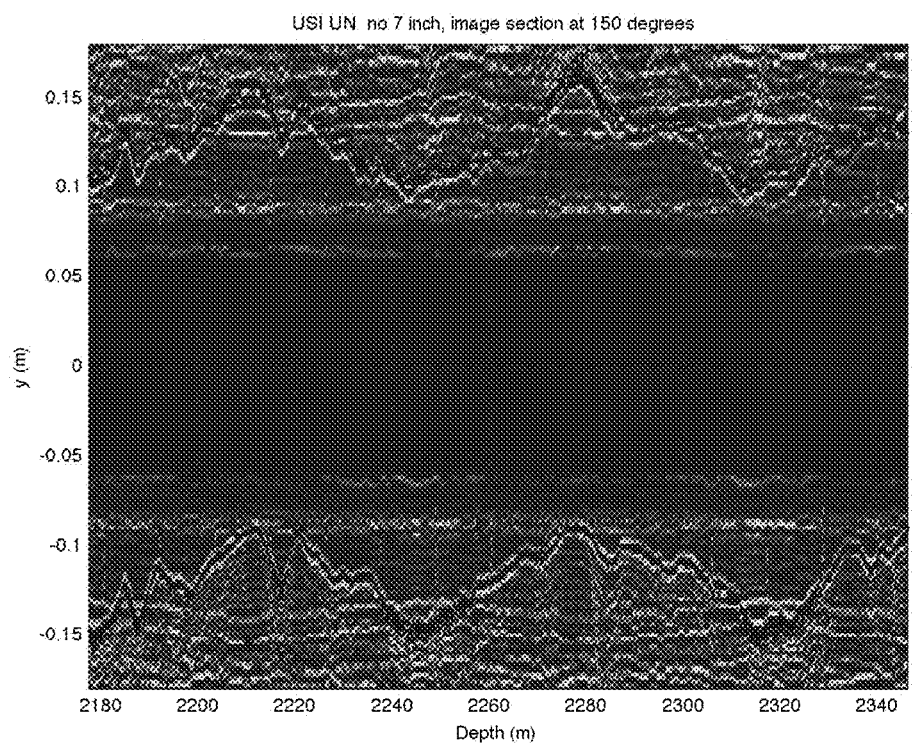
FIG. 20: The same migrated image as in FIG. 19, but with the 7-in casing removed. The blue dots show an automatic picking of the next big event, what appears to be refractions along the 9⅝ in pipe.

FIG. 20 shows the same migrated image as in FIG. 19, but with the 7-in casing removed by a median filter. On the residual, the next big event was automatically picked. These picks are indicated by the blue dots on the image.

Figure 21A:
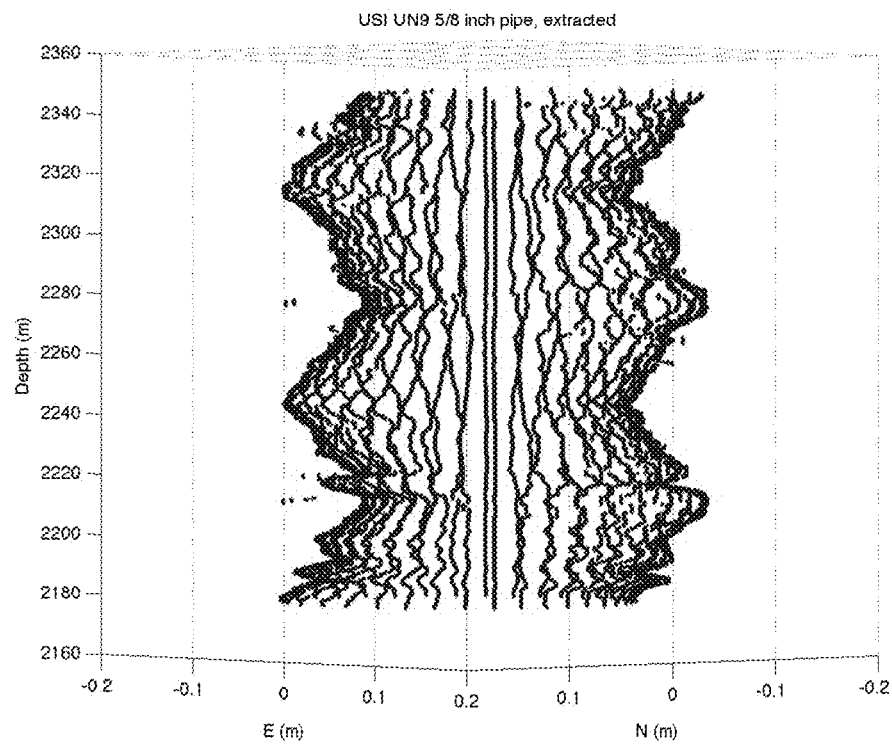
FIG. 21A: The extracted structure outside the 7-in pipe, displayed in 3D (as "bottom up") straight from the side.
Figure 21B:
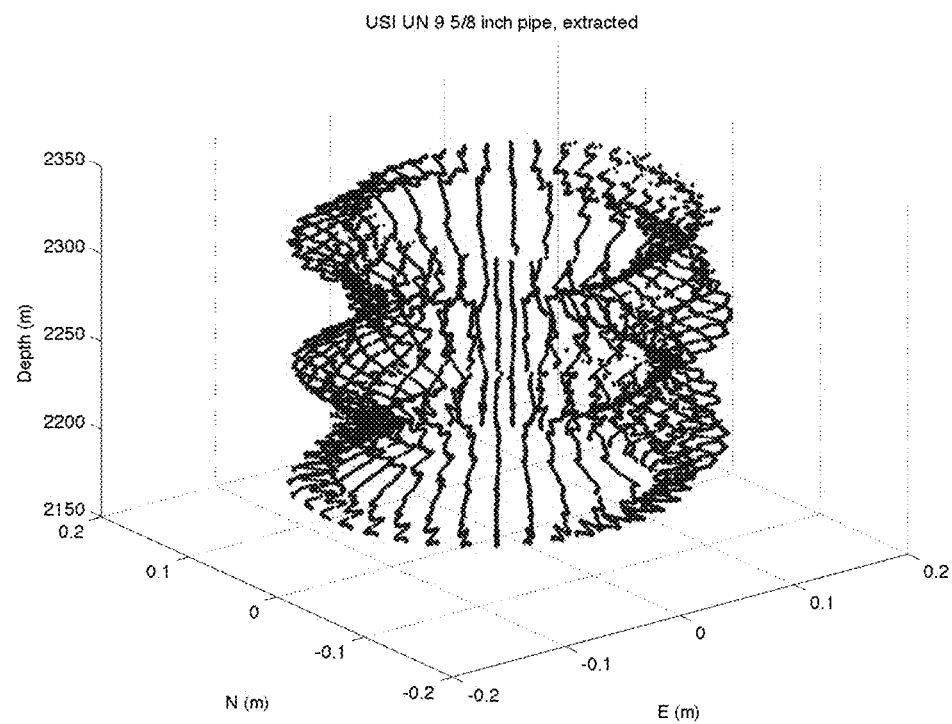
FIG. 21B: The extracted structure outside the 7-in pipe, displayed in 3D (as "bottom up") slightly from the bottom up.

The spatially connected object described by the picked blue dots in FIG. 20 are shown in 3D in FIG. 21.

Figure 22A:
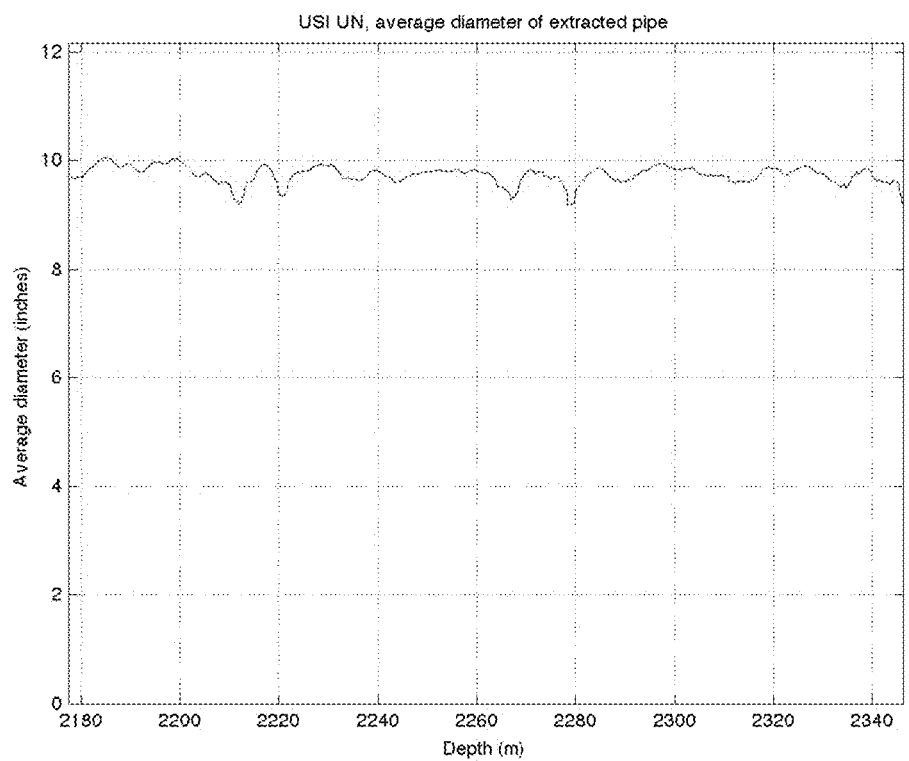
FIG. 22A: Parameters for the extracted object: Diameter.
Figure 22B:
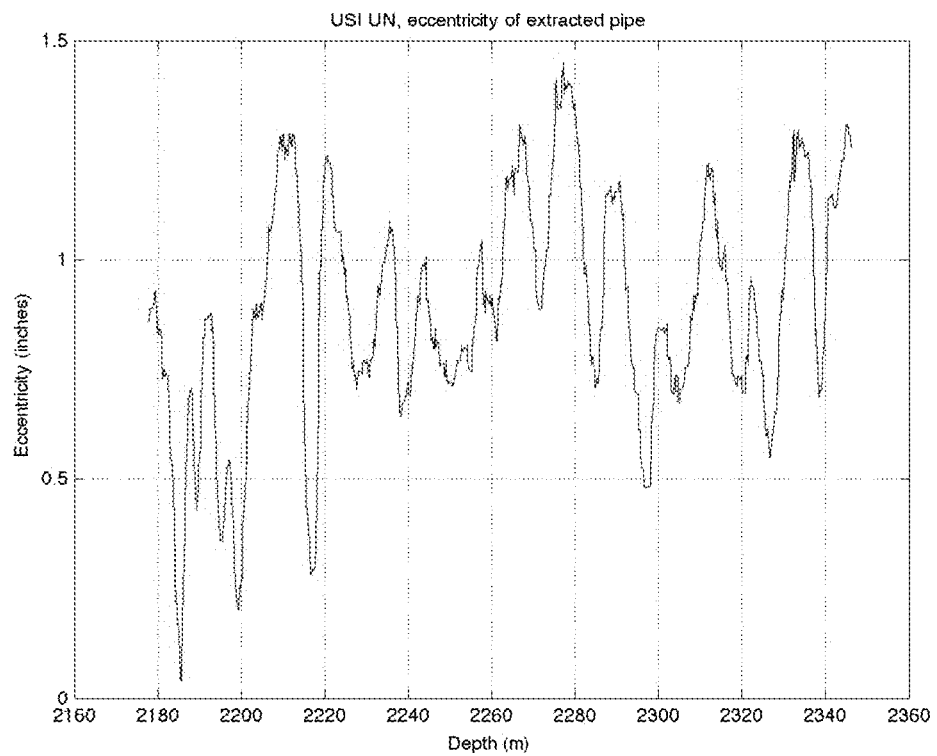
FIG. 22B: Parameters for the extracted object: Eccentricity.
Figure 22C:
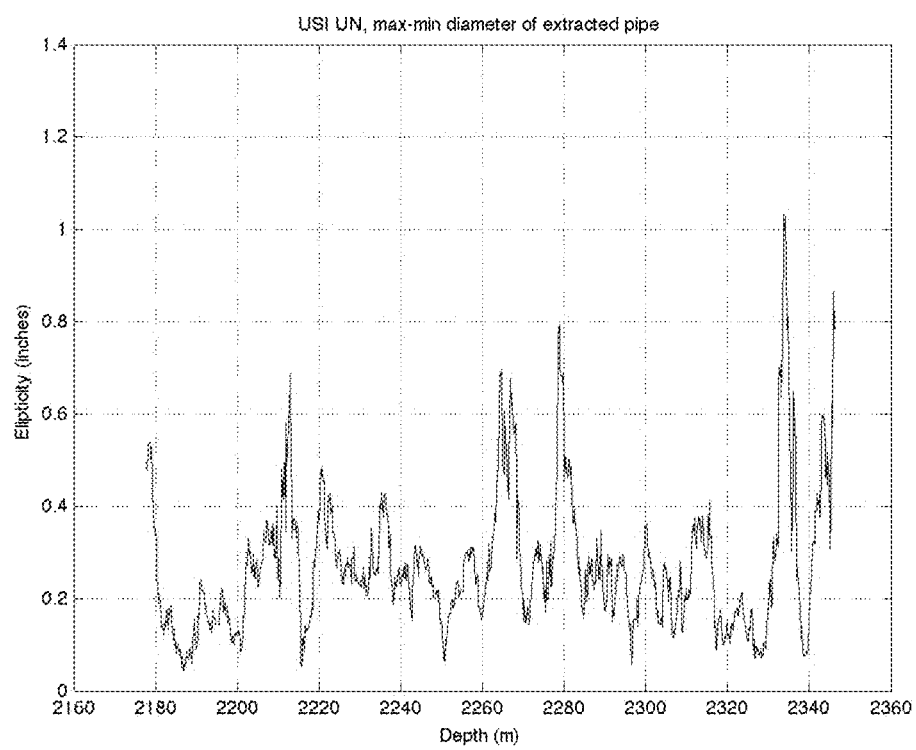
FIG. 22C: Parameters for the extracted object: Ellipticity.

From the picked events, we next extract their eccentricity relative to the center of the 7-in casing, the average diameter around the azimuths, and the "ovality"-which we define as the difference between the maximum and minimum diameter relative to the average. These parameters are shown in FIG. 22. The set of parameters for the object is consistent with it being identified as the 9⅝ casing.

Figure 23A:
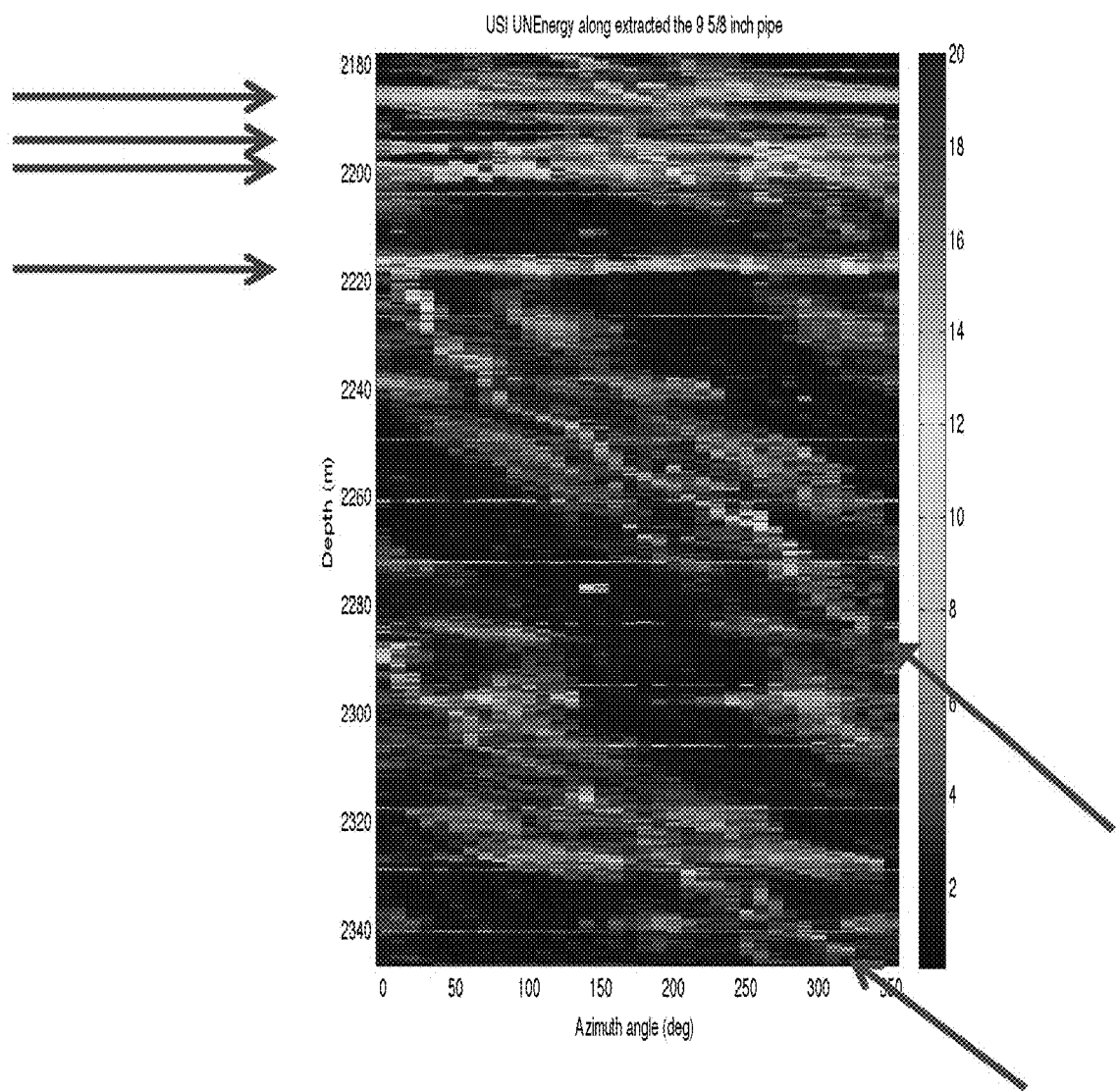
FIG. 23A: Reflection amplitudes along the object extracted from outside of the 7-in casing, identified as the 9⅝-in casing. We interpret the higher-amplitude abnormalities indicated by the red arrows, near the top of the section, starting at 2220 m as an indication of absence of cement or patchy cement outside the casing shallower than 2220 m. The higher amplitude event (red arrows) cork-screwing around the pipe deeper could be an indication of a channel. (We expect the "cork-screwing" to be related to the rotation of the tool (FIG. 18)
Figure 23B:
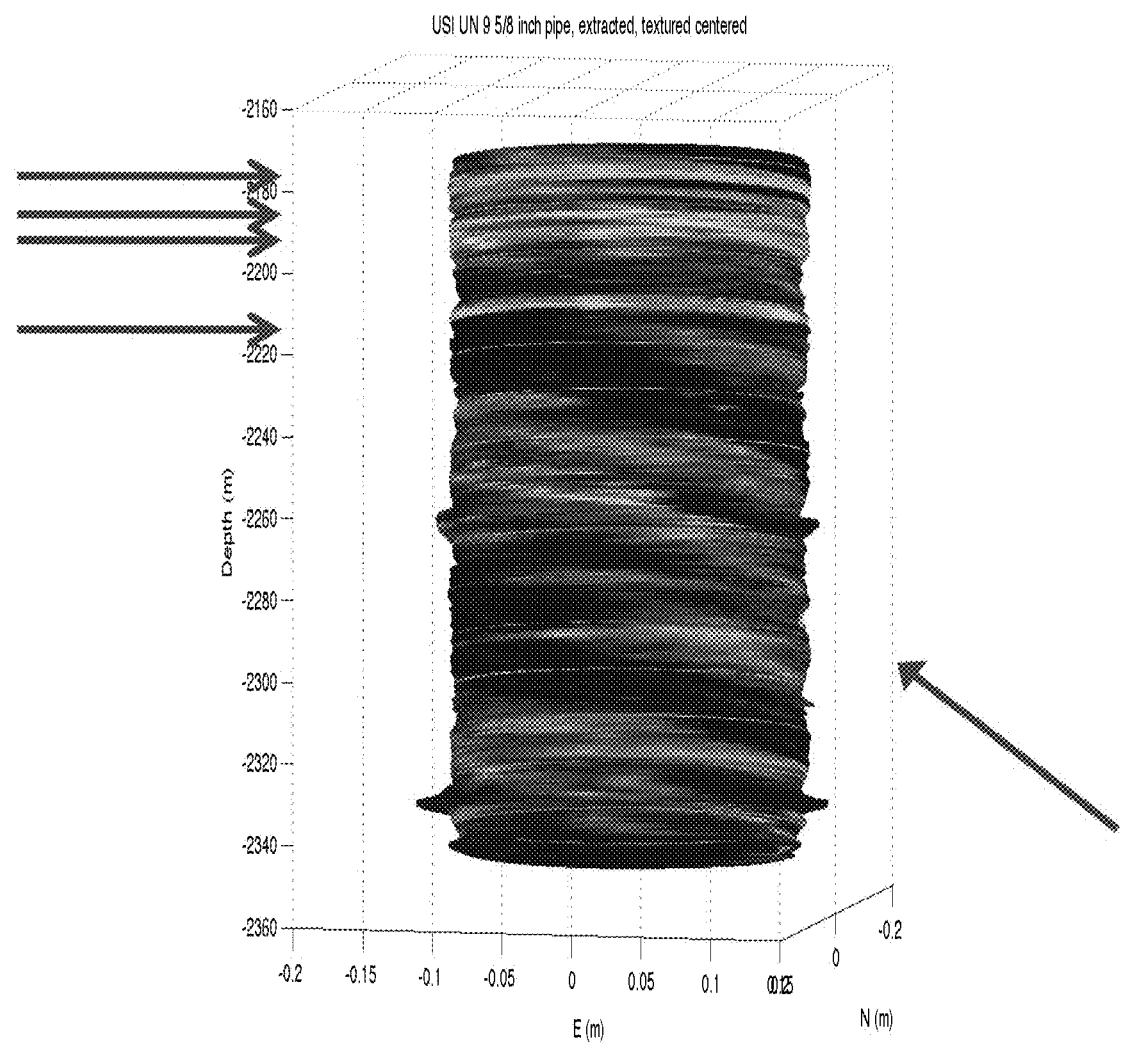
FIG. 23B: Reflection amplitudes along the object extracted from outside of the 7-in casing, identified as the 9⅝-in casing. We interpret the higher-amplitude abnormalities indicated by the red arrows, near the top of the section, starting at 2220 m as an indication of absence of cement or patchy cement outside the casing shallower than 2220 m. The higher amplitude event (red arrows) cork-screwing around the pipe deeper could be an indication of a channel. (We expect the "cork-screwing" to be related to the rotation of the tool (FIG. 18). The 3D amplitude distribution is draped as texture around the pipe.

In FIGS. 23A and 23B, we show the mean absolute reflection amplitudes within a 2-cm window around the blue-dot object in FIG. 20. Higher-amplitude abnormalities in the amplitude plot are indicated by red arrows. We interpret the abnormality, from 2220 m and up, to be indicating the absence of cement or patchy cement outside the casing for this top section. If this is the top-of-cement this is about 30 m shallower than the well sketch in FIG. 13 indicated.

The higher-amplitude event that appears to be cork-screwing around the pipe deeper (red arrows), could be an indication of a channel behind the casing. (We expect the "cork-screwing" to be mostly related to the rotation of the tool as shown in FIG. 18. In FIG. 23B, we show in 3D the amplitude distribution draped as texture around the pipe.

Although we do not show it in this report, the refraction imaging that we have applied to the Isolation Scanner data, can obviously also be applied to the data acquired with the Sonic Scanner.

REFERENCES

Borland, W., Edwards, J., Kurniawan, H., Goossens, P. and Fuping, Z., 2007, Borehole acoustic reflection survey for geosteering validation: Presented at the 1st Annual Middle East Regional Symposium, SPWLA.

Esmersoy, C., Chang, C., Kane, M., Coates, R., Tichelaar, B., and Quint, E., 1998. Acoustic imaging of reservoir structures from a horizontal well; *The Leading Edge*, 17, 940-946.

Fuping, Z., Alexander, D., Goossens, P., Kurniawan, H., Borland, W. and Edwards, J., 2007, First Sonic Imaging AVA: *77th Ann. Internat. Mtg.*, Soc. Expl. Geophys., Extended Abstracts, 538-541.

Haldorsen, J., Borland, W., Al Rougha, H. A. B., Sultan, A., Meehan, R, 2005: "Azimuthal Sonic Imaging." Extended Abstract, 67th Mtg.: Eur. Assn. Geosci. Eng., paper I-017, Madrid Haldorsen, J. B. U., Voskamp, A., Thorsen, R., Vissapragada, B., Williams, S. and Fejerkov, M., 2006, Borehole acoustic reflection survey for high resolution imaging: 76th Ann. Internat. Mtg., Soc. Expl. Geophys., Extended Abstracts, 314-318.

Haldorsen, J., A. Voskamp, R. Thorsen, B. Vissapragada, S. Williams, and M. Fejerskov (Hydro), 2006, "Borehole Acoustic Reflection Survey for high resolution imaging", SEG Expanded Abstracts 25, 31.

Havira, R. M., 1986, Ultrasonic techniques in oil well logging, in Proc. IEEE Ultrason. Symp., 563-571.

Hayman, A. J., P. Parent, P. Chung, and P. Verges, 1994, Improved borehole imaging by ultrasonic, paper SPE 28440, 69$^{th}$ SPE Annual Technical Conference and Exhibition, New Orleans, La.

Hirabayashi, N., Leaney, W. S. and Haldorsen, J. B. U., 2008, Wavefield separation for borehole acoustic reflection surveys using parametric inversion: 78th Ann. Internat. Mtg., Soc. Expl. Geophys., Extended Abstracts.

Hornby, B. E., 1989. Imaging of near-borehole structure using full-waveform sonic data, Geophysics, 54, 747-757.

Maia, W., R. Rúbio, F. Junior (Petrobras), J. Haldorsen, R. Guerra, and C. Dominguez, 2006, "First Borehole Acoustic Reflection Survey mapping a deep-water turbidite sand", SEG Expanded Abstracts 25, 1757

Van Kuijk, R., B. Froelich, M. Alouch, S. Bose, D. Miller, J.-L. le Calvez, V. Schoepf, and A. Pagnin, 2005, A Novel Ultrasonic Cased-Hole Imager for Enhanced Cement Evaluation, IPTC 10546, International Petroleum Technology Conference, 2005.

Yamamoto, H., Haldorsen, J. B. U., Mikada, H. and Watanabe, S., 1999, Fracture imaging from sonic reflection and mode conversion: 69th Ann. Internat. Mtg., Soc. Expl. Geophys., Extended Abstracts, 148-151.

Zeroug, S., B. Froelich, 2003, Ultrasonic Leaky-Lamb Wave Imaging Through a Highly Contrasting Layer, IEEE Ultrasonic Symposium, 798.

The invention claimed is:

1. A method for characterizing properties outside a multiple casing string, comprising transmitting acoustic signals from a source located inside said multiple casing string; recording received signals on an array of acoustic receivers mounted on a longitudinal cylindrical tool inside said multiple casing string, and processing received signals by performing the following steps:
   a. separating received acoustic signals into components of propagating plane waves by measuring the phase delay of received signals;
   b. estimating propagation parameters for each component of propagating plane waves for differentiating different propagating wave modes;
   c. sorting propagating wave modes into borehole modes and body wave modes;
   d. processing and characterizing body wave modes for characterizing properties outside of the multiple casing string; and
   e. estimating direction of abnormalities based on ray parameters of the plane wave components.

2. The method according to claim 1, where the estimation of propagation parameters for each component of propagating plane waves is based on signal power and semblance measured.

3. The method according to claim 1, where characterized properties includes air pockets and quality of cement outside the casing string.

* * * * *